United States Patent [19]

Yamashita et al.

[11] Patent Number: 5,159,586

[45] Date of Patent: Oct. 27, 1992

[54] DEVICE FOR PROCESSING OPTICAL DATA

[75] Inventors: Tsukasa Yamashita, Nara; Shiro Ogata, Takatsuki; Keiji Hanada, Matsumae, all of Japan

[73] Assignee: Omron Tateisi Electronics Co., Kyoto, Japan

[21] Appl. No.: 866,587

[22] Filed: May 23, 1986

[30] Foreign Application Priority Data

| May 24, 1985 | [JP] | Japan | 60-110270 |
| May 24, 1985 | [JP] | Japan | 60-110271 |
| May 24, 1985 | [JP] | Japan | 60-110274 |
| May 24, 1985 | [JP] | Japan | 60-110275 |
| Aug. 8, 1985 | [JP] | Japan | 60-173162 |
| Jan. 28, 1986 | [JP] | Japan | 61-14838 |

[51] Int. Cl.[5] .............. G11B 7/00; G11B 21/10; G11B 5/09; G01J 1/20
[52] U.S. Cl. .............. 369/44.11; 250/201.1; 369/44.14; 369/122; 385/1
[58] Field of Search ...... 369/44, 45, 46, 112, 369/120, 121, 122, 13; 350/96.11, 96.12, 96.13, 96.14, 96.18, 96.19; 250/201, 202

[56] References Cited

U.S. PATENT DOCUMENTS

| 3,668,404 | 6/1972 | Lehovec . | |
| 4,085,423 | 4/1978 | Tsunoda | 369/112 |
| 4,190,775 | 2/1980 | Sakurai | 369/44 |
| 4,418,980 | 12/1983 | Keil | 350/96.18 |
| 4,425,023 | 1/1984 | Matsumoto | 369/112 |
| 4,478,483 | 10/1984 | Sprague | 369/45 |
| 4,570,191 | 2/1986 | Stefano | 369/13 |
| 4,611,883 | 9/1986 | Myer | 350/96.18 |
| 4,672,187 | 6/1987 | Fujita et al. | 369/45 |
| 4,737,946 | 4/1988 | Yamashita | 369/122 |
| 4,747,090 | 5/1988 | Yamashita | 369/112 |

FOREIGN PATENT DOCUMENTS

| 0174008 | 9/1985 | European Pat. Off. . | |
| 58-130448 | 8/1983 | Japan | 369/45 |
| 57-10959 | 10/1983 | Japan . | |
| 59-69732 | 4/1984 | Japan . | |
| 59-79441 | 5/1984 | Japan . | |
| 59-107431 | 6/1984 | Japan . | |
| 59-148154 | 8/1984 | Japan . | |
| 61-94245 | 5/1986 | Japan | 369/45 |
| 61-236037 | 10/1986 | Japan | 369/45 |

OTHER PUBLICATIONS

T. Suhara, K. Kobayashi, H. Nishihara and J. Koyama, "Graded-index Fresnel lenses for integrated optics", Applied Optics, vol. 21, No. 11, p. 1666, Jun. 1, 1982.

D. Heitmann and R. V. Pole, "Two-dimensional focusing holographic grating coupler", Appl. Phys. Lett., 37(7), p. 585, Oct. 1, 1980.

K. Takizawa, "Electrooptic Fresnel lens-scanner with an array of channel waveguides", Applied Optics, vol. 22, No. 16, p. 2468, Aug. 15, 1983.

Primary Examiner—John W. Shepperd
Assistant Examiner—Christopher R. Glembocki
Attorney, Agent, or Firm—Dickstein, Shapiro & Morin

[57] ABSTRACT

A device for processing optical data comprising a transparent substrate for a light to be applied, light source for projecting the diverging light onto one surface of the substrate substantially perpendicularly to the surface, lens provided on the substrate for causing the projected light to emerge obliquely or vertically upward from the other surface of the substrate and focusing the emergent light, photodetector provided on the substrate for receiving the light reflected from above, focusing drive mechanism for adjusting the position of the substrate upward or downward, and tracking drive mechanism for adjusting the position of the substrate laterally.

50 Claims, 21 Drawing Sheets

DEVICE FOR PROCESSING OPTICAL DATA

BACKGROUND OF THE INVENTION

1. Technical Field

The present invention relates to devices for processing optical data typical of which are optical pick-up devices for reading data from optical disc memories, and devices for writing (recording or erasing) data in photomagnetic disc memories or reading (playing-back) data therefrom. The photomagnetic disc memories are expected to be put to practical use in a near feature, since data can be written therein in a very high density, read out or erased therefrom. The optical pick-up device is adapted to converge laser light from a semiconductor laser or the like, project the converged light to the data record portion of the optical disc and read data according to the variations of intensity of the light reflected from the portion.

2. Prior Art

With the introduction of optical disc memories of high record density into use in recent years, it is expected to develop efficient, compact and lightweight optical pick-up devices.

Conventional optical pick-up devices consist primarily of an optical system and a drive system.

Basically, the optical system has the function of converging laser light on the record portion of an optical disc by a condenser lens and converting the light reflected from the disc into electric signals by a photodiode. Thus, variations in the amount of reflected light due to the data recorded on the disc are taken out in the form of electric signals.

Such optical systems are divided, according to their action, into isolator optical systems for separating the light reflected from the optical disc from the light impinging on the disc, beam converging optical systems for converging the light to be projected onto the optical disc to a spot of about 1 micron in diameter, and error detecting optical systems for detecting focusing errors or tracking errors. These optical systems comprise a suitable combination of elements such as a semiconductor laser serving as a light source, various lenses, prisms, diffraction gratings, mirrors, quarter wave plates and photodiodes.

Useful drive systems include a focusing drive system, tracking drive system and a radial feed drive system.

The focusing drive system is adapted to maintain a suitable distance between the condenser lens and the optical disc so that the light beam formed by the condenser lens forms a proper spot on the disc surface. Most commonly, the condenser lens is moved axially thereof for adjustment.

The tracking drive system is adapted to cause the laser spot to follow the track of the optical disc without displacement. The mechanisms generally used for this purpose include one for moving the condenser lens perpendicular to the optical axis for adjustment, one for moving the entire optical pick-up head radially of the optical disc for adjustment, and one comprising a pivotable mirror for adjusting the angle of incidence of light on the condenser lens.

The radial feed drive system is a mechanism for feeding the optical pick-up head radially of the optical disc usually by a linear motor.

These conventional optical pick-up devices have the following drawbacks.

The optical system, which is complex, is cumbersome to optically align the components, which are liable to become out of alignment due to vibration.

The device comprises a large number of components, takes much time to assemble and is low in productivity.

The device comprises expensive optical components and is expensive in its entirety.

Use of large optical components renders the device large-sized, while the means needed for holding the optical components make the whole device heavy.

On the other hand, since the photomagnetic disc is capable of being written and read out data, many researches or studies therefor are conducted and some types of record/play-back devices are made on an experimental basis.

The principle of recording or writing data on the photomagnetic disc is as follows: By impinging the light on the record medium such as photomagnetic disc to increase the temperature locally and at the same time by applying the magnetic field thereon, the direction of magnetization of the small area is changed. The section of the area where the temperature is to be increased can be very small to the extent of about 1 micron in diameter, so that it is possible to achive a very high record density. Data can be recorded by applying very week magnetic field, since, in general, magnetic field intensity required to magnetically record data decreases with increase of the temperature of the record medium.

Two methods of recording and erasing are proposed at present time. One is a magnetically modulating method. According to this method, the record medium is irradiated with the laser light constantly and the intensity of the magnetic field applied to the record medium is changed according to data to be written. Another method is called an optically modulating method by which a direct magnetic field is applied to the medium constantly and the laser light to be projected thereto is on-off switched according to data.

It is said that there are a direct optical play-back method and indirect optical play-back method. The former method utilizes such phenomenon that upon impinging a linearly polarized light directly on the record location of the medium, the direction of polarization of the light reflected from (or transmitted through) the portion rotates according to the magnetooptic effect. By the latter method the record pattern on the medium is transferred or copied to a magnetic thin film to read the record.

In any way, the devices for photomagnetically recording and playing-back which are made at present time, especially the playing-back components thereof have the same drawbacks as those of above mentioned conventional optical pick-up devices.

SUMMARY OF THE INVENTION

The main object of the present invention is to provide a device for processing optical data which is compact and lightweight and has a simple construction.

The device of the present invention for processing optical data comprises a substrate which is transparent for the light to be applied, a light source for projecting the diverging light onto one surface of the substrate substantially perpendicularly to the surface, lens means provided on the substrate for causing the projected light to emerge obliquely upward or perpendicularly upward from the other surface of the substrate and focusing the emergent light, means provided on the substrate for receiving the light reflected obliquely or perpendicularly from above, a focusing drive mechanism for adjusting the position of the substrate upward or downward, and a tracking drive mechanism for adjusting the position of the substrate laterally.

The device of the present invention includes none of lens, prism, diffraction grating, mirror, quarter wave plate. etc. serving as optical components and can therefore be made compact and lightweight. Especially because laser light is caused to emerge from the substrate upward and to impinge on the light receiving means upon reflection from above, and the paths of emergent light and reflected light are separated from each other, the isolator optical system needed for conventional pick-up devices can be dispensed with. Further the device according to the present invention is adapted to project the light from the light source onto one surface of the substrate and to emerge the light from other surface of the substrate upon transmitting the light through the substrate in the direction of thickness, so that it is not necessary to fabricate a waveguide on the substrate, resulting a simple construction. The device can be fabricated easily.

The device of the present invention suitable for writing data on the photomagnetic disc and/or reading out data therefrom comprises a first optical system for projecting the light forming a spot on the photomagnetic disc and for receiving the reflected light therefrom, and a second optical system for detecting an error to cause the light spot formed by the first optical system to follow the track of the photomagnetic disc, the first and second optical systems being provided on a substrate which is transparent for the light applied to the device. The first optical system comprises a light source for projecting the diverging light onto one surface of the substrate substantially perpendicularly to the surface, lens means for causing the projected light to emerge obliquely or perpendicularly upward from the other surface of the substrate and for focusing the emergent light two-dimensionally, means for receiving the light reflected obliquely or perpendicularly from above and having at least two light receiving elements, and analyzers provided on the light receiving elements and arranged so that the directions of principal axes thereof make a right angle with each other. The second optical system comprises a light source for projecting the diverging light onto one surface of the substrate substantially perpendicularly to the surface, lens means for causing the projected light to emerge obliquely or perpendicularly upward from the other surface of the substrate and for focusing the emergent light two-dimensionally, means for receiving the light reflected obliquely or perpendicularly from above.

The device according to the present invention can be used in both magnetically modulating and optically modulating methods above mentioned and also in direct optical play-back system. The device of the present invention is provided with a coil for yielding the magnetic field when the device is used Other features of the present invention will become apparent from the following embodiments to be described with reference to the accompanying drawings.

DESCRIPTION OF THE PREFERRED EMBODIMENTS

Outline of Construction of Optical Pick-Up Head

Figure 1:
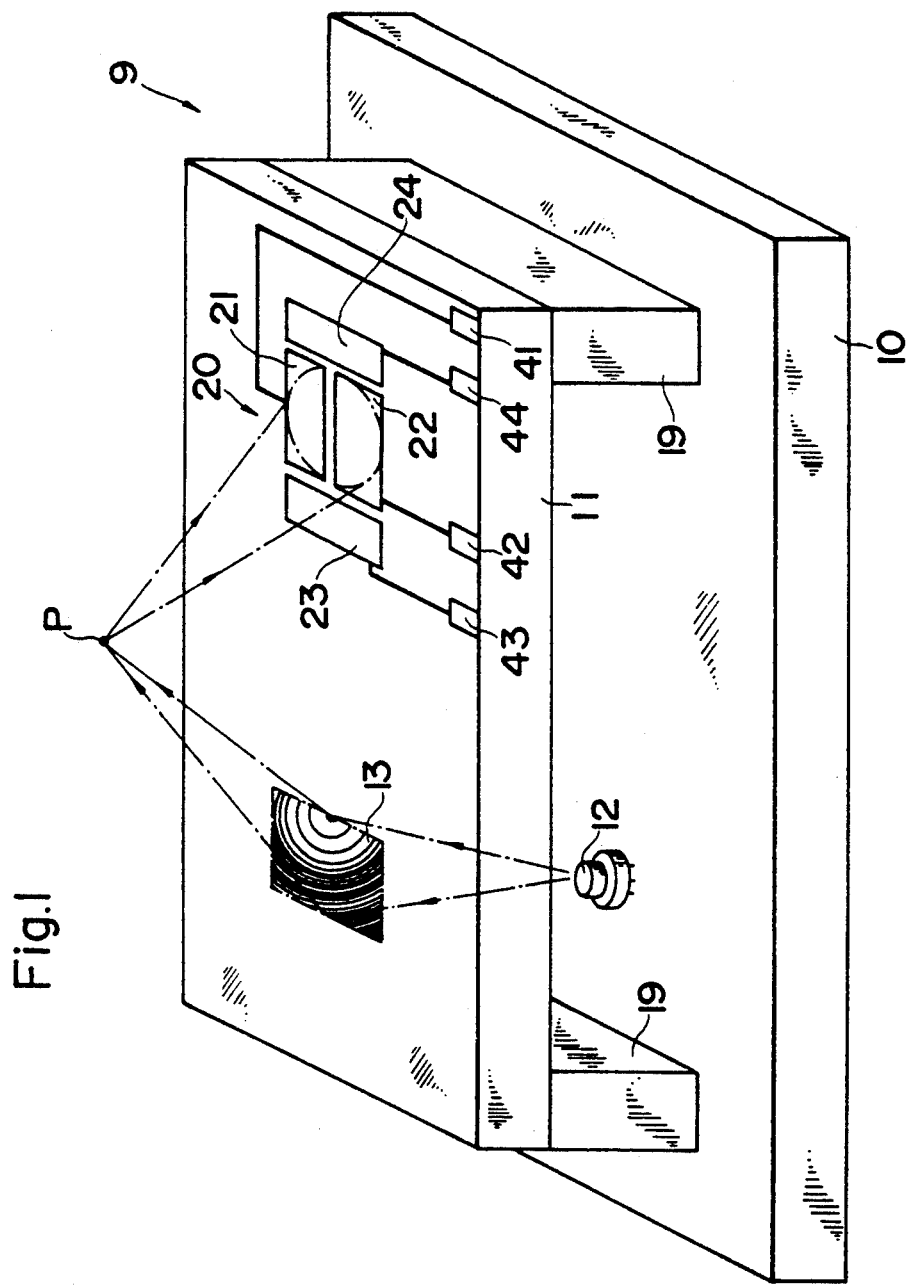
FIG. 1 is a perspective view showing an optical pick-up head.

FIG. 1 shows the construction of an optical pick-up head. A substrate 11 is fixedly arranged on a base 10 by means of appropriate supporting members 19. The substrate 11 is made of a material, for example a glass, which is transparent for the light used, light beam emitted from a semiconductor laser 12 for instance.

An off-axis grating lens 13 is formed on the substrate 11 at one side portion thereof. The semiconductor laser 12 serving as a light source is arranged below the grating lens 13 and is fixed onto the base 10 by means of suitable fixing means (not shown). The grating lens 13 causes the diverging light emitted from the semiconductor laser 12 from below and transmitted to the lens 13 traversing through the substrate 11 to emerge obliquely upward and focuses the light two-dimensionally. The point where the emergent laser beam is focused into a spot (about 1 μm in diameter) is indicated at P. When the data recorded on an optical disc is to be read, the optical pick-up head 9 is so positioned that the laser spot P is positioned on the data record surface of the disc.

A light receiving unit 20 is formed on the substrate 11 at the portion apart from the grating lens 13 by appropriate distance for receiving the light beam reflected from the record surface of the optical disc. The unit 20 is so disposed as to receive the beam reflected obliquely downward from the position of the laser spot P.

The light receiving unit 20 comprises four independent photodetectors 21 to 24. The photodetectors 21 and 22 are arranged adjacent to each other in the center, and the other photodetectors 23 and 24 are arranged on opposite sides of them. The photodetectors 21 to 24 are provided, for example, by vacuum evaporation of amorphous silicon (a-Si) on the substrate 11. The output signals from the photodetectors 21 to 24 are led through a wiring pattern on the substrate 11 respectively to electrodes 41 to 44, from which the signals are individually led to electrodes (not shown) on the base 10 through wire bonding. A common electrode for the photodetectors 21 to 24 is not shown in FIG. 1.

Since the data recorded on the optical disc appears as variations in the intensity of reflected light beam, the cumulative signal of the output signals from all the photodetectors 21 to 24, or a cumulative signal from the photodetectors 21 and 22 serves as a data reading signal.

Alternatively, materials other than amorphous silicon, such as CdTe or CdS is usable for forming the photodetectors.

Figure 2:
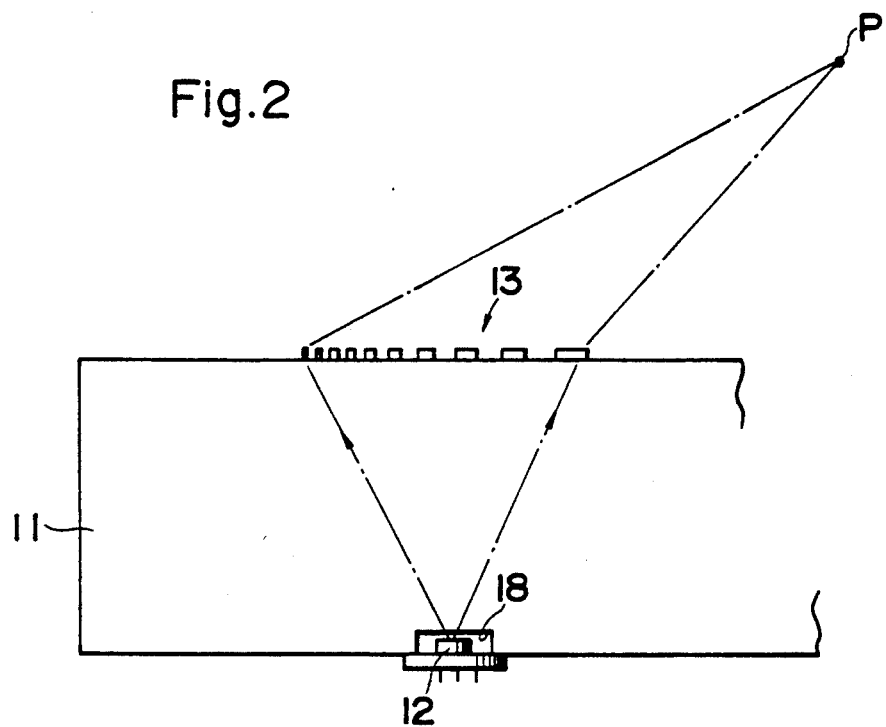
FIG. 2 shows another example of arrangement of a semiconductor laser.

FIG. 2 shows another example of arrangement of semiconductor laser 12. A thicker substrate than that shown in FIG. 1 is provided. The substrate 11 has a recess 18 formed on the under surface at the position just below the grating lens 13 formed on the upper surface thereof. The semiconductor laser 12 is arranged in the recess 18 and fixed to the substrate by an adhesive. It serves to render the construction of optical pick-up head 9 more simple that the semiconductor laser 12 is attached to the under surface of the substrate 11 as described above.

The positioning of the semiconductor laser 12 is conducted as follows; The semiconductor laser 12 accepted in the recess 18 is supported by a stage being capable of fine adjustment in the direction of X, Y and Z and angle θ. Further the optical pick-up head 9 is so arranged with respect to the optical disc provided for adjustment that the light emitted from the semiconductor laser 12 and focused by the grating lens 13 is properly reflected from the surface of the adjustment disc. The reflected light beam is received by the light receiving unit 20. On the other hand, a circuit for generating reference voltage is provided, the reference voltage corresponding to a voltage signal which would be output from the light receiving unit 20 when the tracking and focusing of the light spot on the adjustment disc are adjusted to optimum condition. Upon comparing the output signal from the unit 20 with the reference voltage, the position of semiconductor laser 12 is finely adjusted by moving the stage so that the difference between the output voltage of the unit 20 and the reference voltage becomes minimum. The semiconductor laser 12 is fixed to the substrate 11, for example, by means of an instantaneous adhesive when the semiconductor laser 12 reaches to an optimum position.

Figure 3:
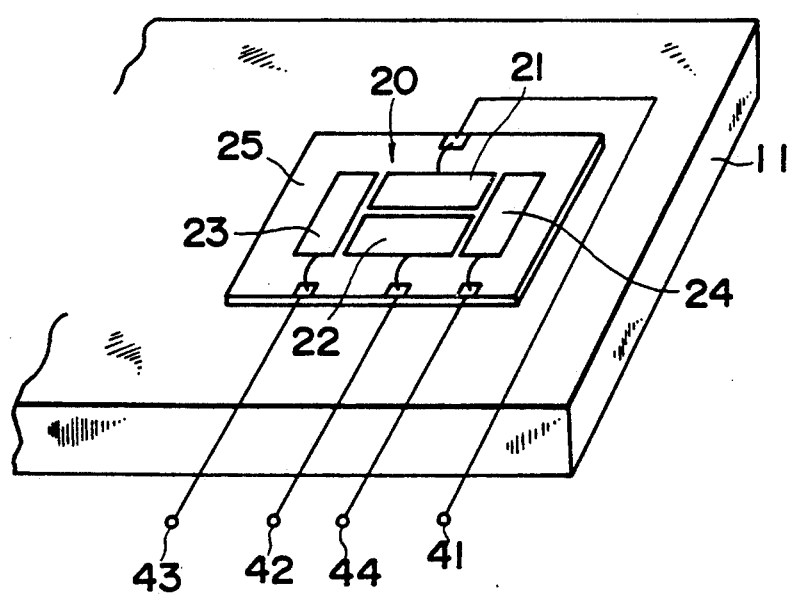
FIG. 3 is a perspective view showing another example of light receiving portion.

FIG. 3 shows another example of the light receiving unit. Four photodetectors 21 to 24 included in the light receiving unit 20 are formed on a separate chip 25 from the substrate 11. These photodetectors 21 to 24 are provided, for example, by forming four independent PN junctions (photodiodes) on the Si chip 25. The light receiving chip 25 is adhered onto the substrate 11. The chip 25 also positioned by the same manner as described above. That is, on one hand the semiconductor laser 12 is previously fixed, on the other hand, while adjusting the position of the chip 25, it is fixed when the output of the light receiving unit 20 indicates maximum value.

Off-Axis Focusing Lens

Figure 4:
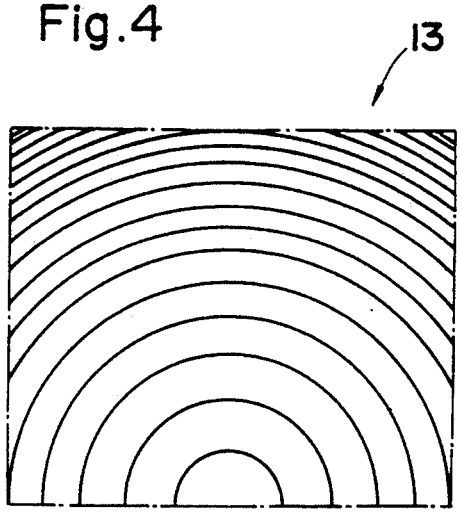
FIGS. 4 and 5 are a plan view and a sectional view, respectively, showing a grating lens.
Figure 5:
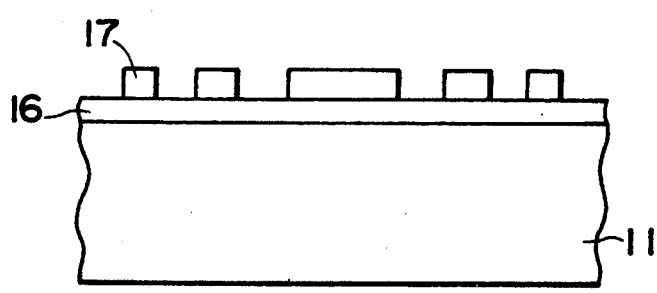

FIGS. 4 and 5 shows the construction of grating lens 13. The grating lens 13 can be fabricated by an electron beam lithography. A conductive thin film 16 is formed on the substrate 11 and thereafter is coated with an electron beam resist uniformly. A predetermined interference fringes pattern is written on the resist with use of an electron beam patterning apparatus controlled by a computer. Thereafter by developing the resist on the substrate 11, parts of resist 17 remains, whereby the grating lens having projections and recesses (corrugation) of interference fringes pattern is realized.

Above mentioned interference fringes patter is resolved and calculated by the computee as a interference fringes pattern produced by a interference between the diverging light emitted from the semiconductor laser 12 and the light caused to emerge obliquely from and focused by the lens 13.

The grating lens may be also provided by forming the corrugation of $SnO_2$ or $InO_2$ on the substrate 11 in place of forming the corrugation of resist 17. In this case, resist pattern mask is formed on the above material. Portions of above material where the mask is not provided are etched by dry etching technique and so on, thereafter the resist pattern is removed.

Off-axis lens is not limited to the above mentioned grating lens. For example, optical lens such as concave lens or convex lens having hemispheric surface may be formed on the substrate 11 integrally. The concave or convex surface is required to have different curvatures depending on the positions, since the above optical lens is a off-axis lens which causes the light to emerge obliquely upward.

Such off-axis focusing lens may be provided on the under surface of the substrate 11 in place of upper surface thereof. Detection of Focusing Errors As well known, the optical disc 80 shown in FIG. 6 comprises a transparent base 81 of disc type on which many pits 82 representing digital data to be recorded are formed circinately, vacuum evaporation film 83 of aluminum deposited on the base 81, and protection film 84 coating the base 81.

Figure 6:
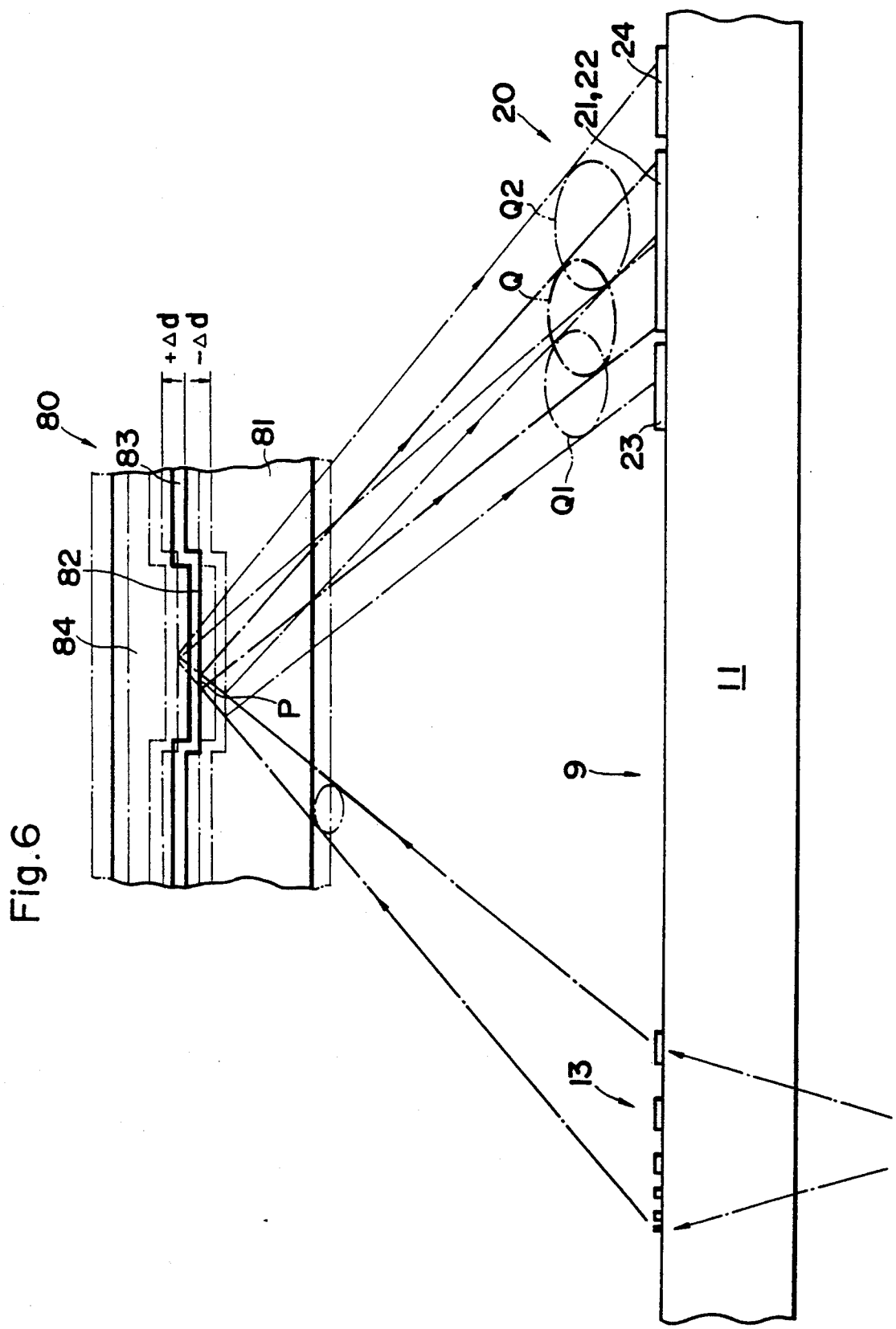
FIG. 6 is a sectional view showing the position relation between an optical disc and the optical pick-up head.

FIG. 6 shows the position relation between a disc 80 and the pick-up head 9 in section taken along the circumferential direction of the disc 80. The laser beam emerging from the grating lens 13 is reflected from the data record surface (the portion including the pit 82 in FIG. 6) and impinges on the light receiving unit 20.

Figure 7:
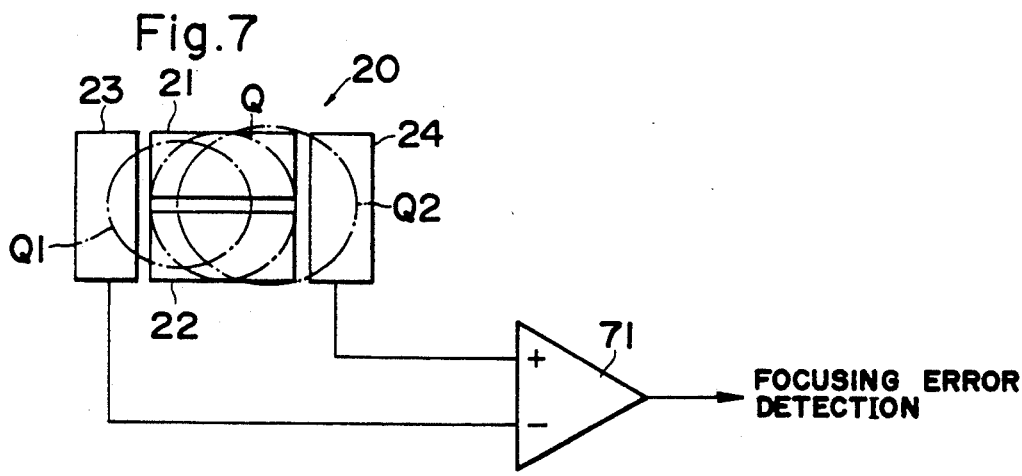
FIG. 7 is a diagram illustrating the principle for detecting focusing errors on the light receiving portion.

FIG. 7 shows the area where the light reflected from the disc 80 impinges on the light receiving unit 20.

With reference to FIG. 6, the disc 80 indicated in solid line is at an optimum distance from the pick-up head 9. It is seen that the emergent beam is properly focused on the disc 80. The area of the light receiving unit 20 irradiated with the reflected beam is indicated at Q. This area Q covers the central photodetectors 21 and 22, while the other photodetectors 23 and 24 receive no reflected beam.

FIG. 6 further shows in broken lines positions of the optical disc 80 when proper focusing is not realized because the distance between the disc 80 and the pick-up head 9 is larger or smaller than the proper distance. When the distance is smaller (displacement of $-\Delta d$), the area Q1 of irradiation with the reflected light shifts toward the photodetector 23. Since the photodetector 23 is connected to the negative side of a differential amplifier 71, with the photodetector 24 connected to the positive side thereof, the output value of the amplifier 71 in this case is negative and represents the displacement $-\Delta d$.

If the distance between the disc 80 and the head 9 is larger (displacement of $+\Delta d$), the area Q2 of irradiation with the reflected light shifts toward the photodetector 24. The output value of the amplifier 71 is positive and represents the displacement $+\Delta d$.

In this way, the output from the differential amplifier 71 indicates whether the beam emerging from the head 9 is properly focused. If there is a focusing error, the output indicates the direction and extent of the error. When there is no focusing error, the output of the amplifier 71 is zero.

Detection of Tracking Errors

Figures 8A, 8B, 8C:
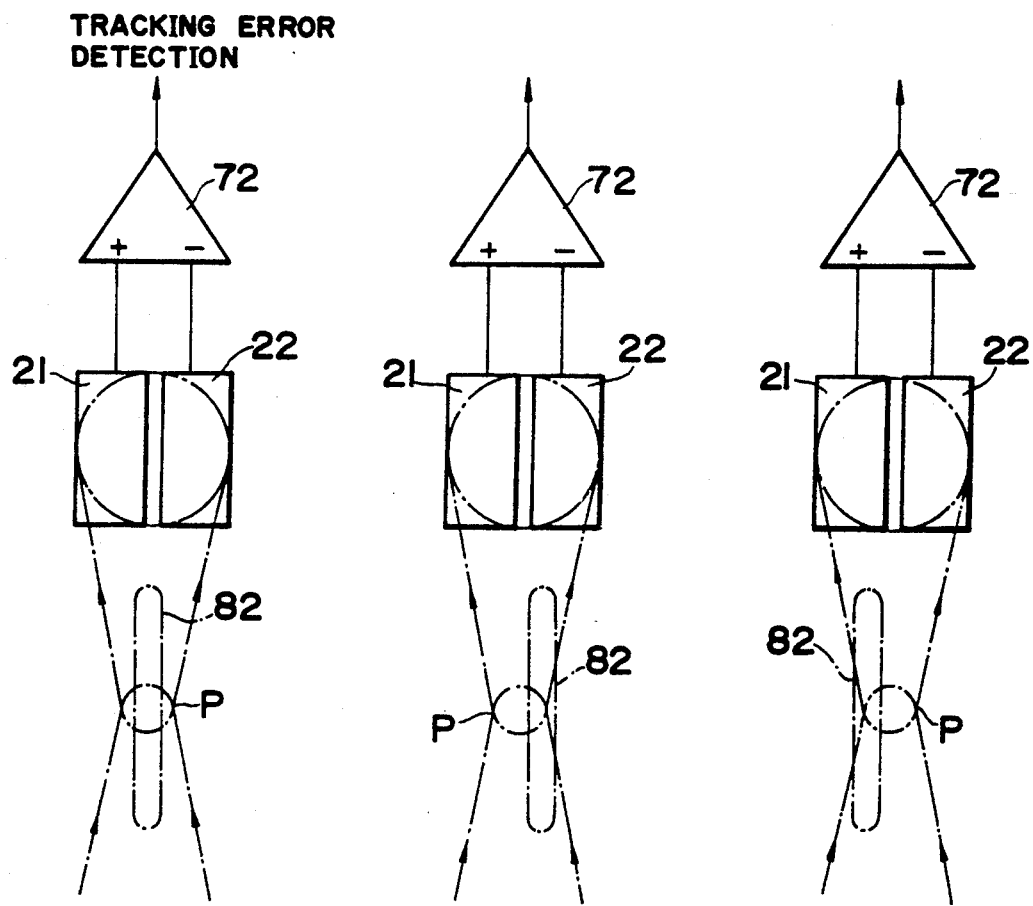
FIGS. 8a, 8b and 8c are diagrams illustrating the principle for detecting tracking errors.

FIGS. 8a to 8c show the pit 82 of the disc 80 and the photodetectors 21 and 21 of the light receiving unit 20 as arranged on a plane. In other words, the photodetectors 21 and 22 are seen through the disc 80 in the direction of its plane. A differential amplifier 72 is illustrated to show that it is electrically connected to the photodetectors 21 and 22. FIG. 8a shows that the laser beam spot P is properly positioned at the center of the track (pit 82) with respect to its width. FIGS. 8b and 8c show that the spot P is slightly displaced from the track (pit 82) widthwise thereof, hence tracking errors. In these cases, it is assumed that the beam is properly focused.

When the laser spot P impinges on the data record surface of the disc 80, the intensity of the reflected light is modulated by the presence of the pit 82. This phenomenon is explained as follows. The spot is slightly larger than the width of the pit 82, so that there exist light reflected at the bottom surface of the pit 82 and light reflected at other portion. Since the depth of the pit 82 is set to about $1/4\lambda$ ($\lambda$=the wavelength of the laser beam), the two kinds of reflected light offset each other owing to a phase difference of $\pi$ therebetween to result in a reduced light intensity. Another explanation is that scattering of light occurs at the edge of pit 82 to reduce the intensity of the reflected light to be received. At any rate, the presence of the pit 82 reduces the intensity of the light to be received by the unit 20.

The photodetectors 21 and 22 are separately positioned on opposite sides of the optical axis. When the center of the laser spot P is positioned at the widthwise center of the pit 82, the amounts of light impinging on the photodetectors 21 and 22 are equal, and the output of the differential amplifier 72 is zero.

When the laser spot P shifts toward the left side of the pit 82 as seen in FIG. 8b, a larger amount of light impinges on the photodetector 31, causing the amplifier 72 to produce a positive output. Conversely, if the laser spot P shifts toward the right side of the pit 82 as shown in FIG. 8c, the amplifier 72 produces a negative output.

In this way, the output of the differential amplifier 72 indicates whether the beam spot P is properly positioned with respect to the track of the disc 80, and further whether the error, if detected, is leftward or rightward.

Focusing and Tracking Drive Mechanisms

Figure 9:
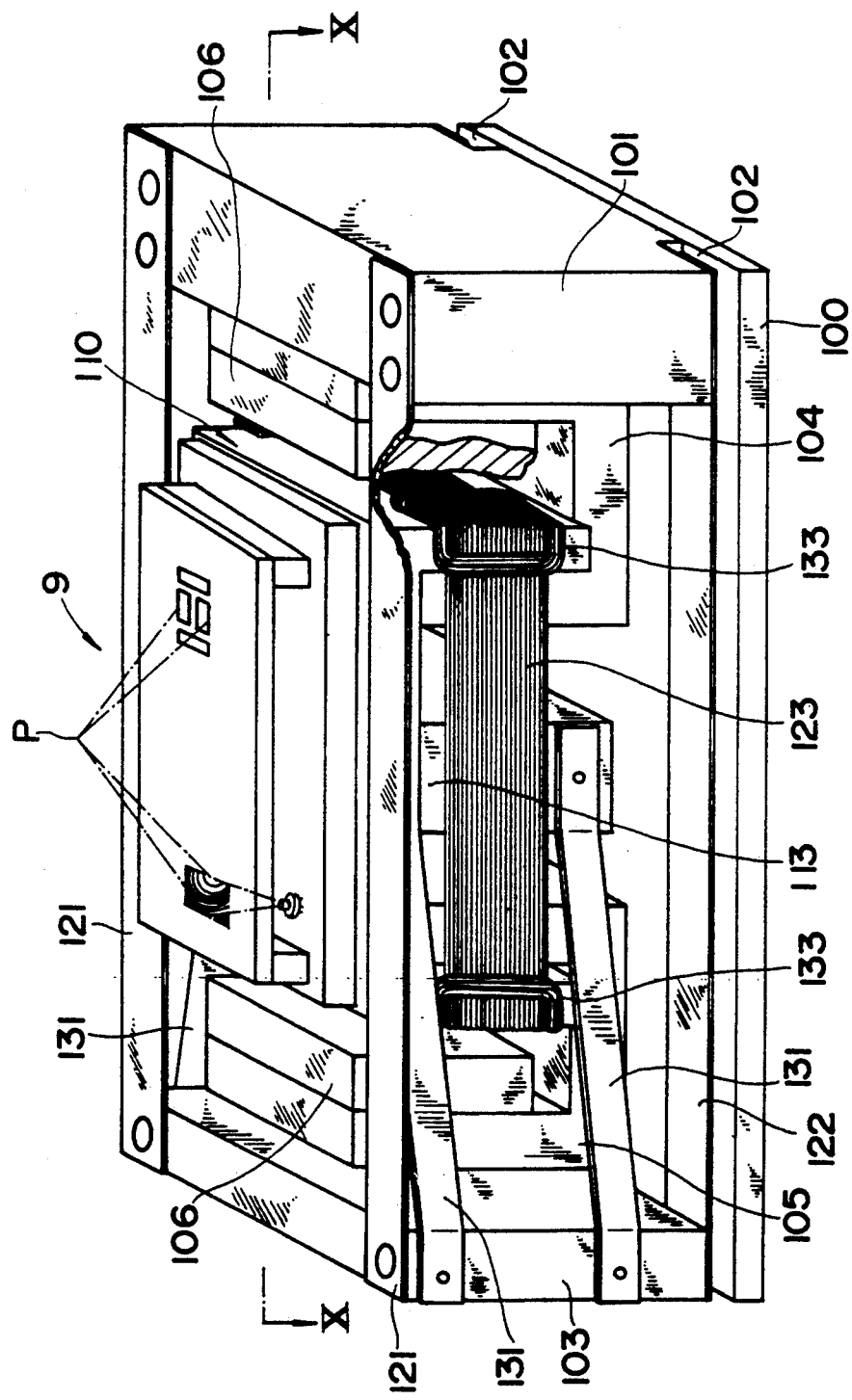
FIG. 9 to FIG. 11 show focusing and tracking drive mechanisms, FIG. 9 being a perspective view, FIG. 10 being a view in section taken along the line X—X in FIG. 9 and FIG. 11 being a plan view showing the mechanisms with the pick-up head removed.
Figure 10:
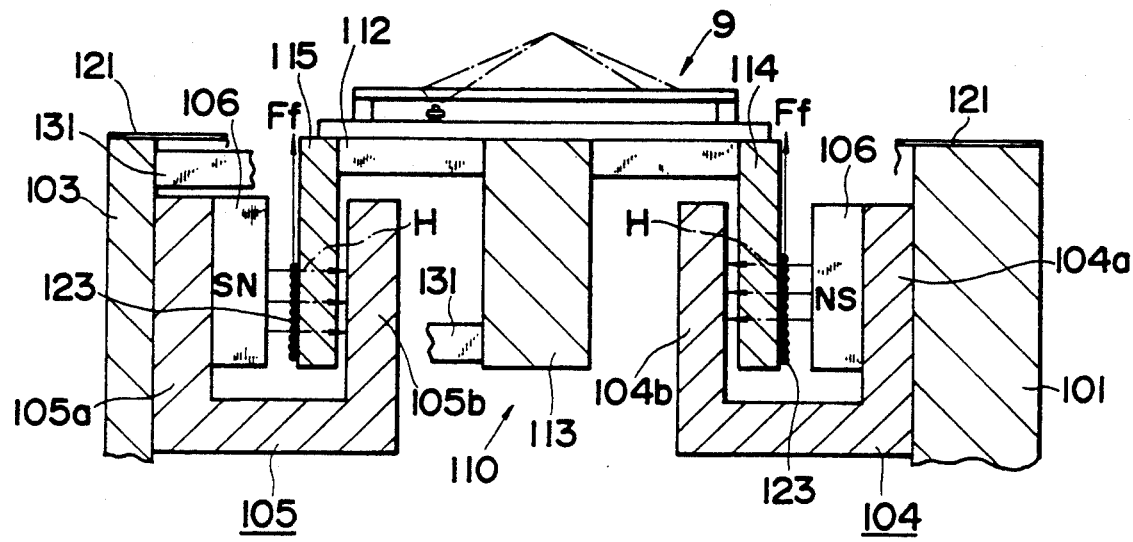
Figure 11:
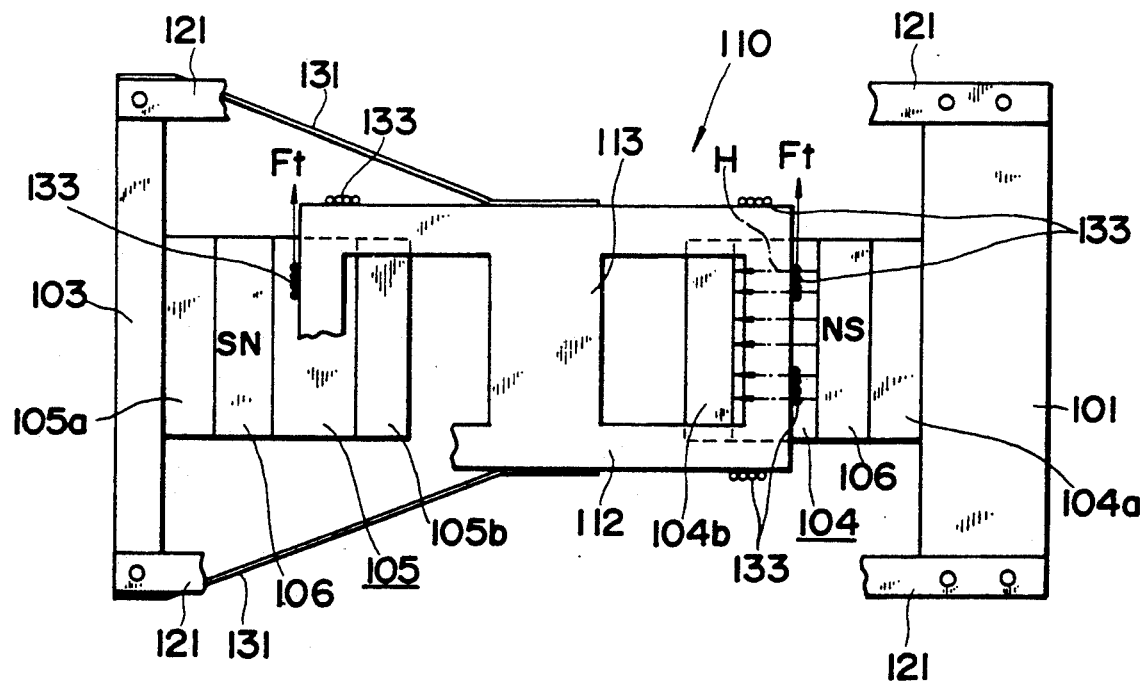

FIG. 9 to FIG. 11 show these drive mechanisms.

A support plate 100 is provided at its one end with an upstanding support member 101. The lower end of the support member 101 is cutout as indicated at 102 at its opposite sides. A movable member 103 is positioned above the other end of the support plate 100. Upwardly or downwardly bendable four plate springs 121, 122 are fixed, each at its one end, to the upper end and lower cutout (102) portions of the support member 101 at its opposite sides. The other ends of the springs are fixed to the upper or lower end of the movable member 103. Accordingly, the movable member 103 is supported by these plate springs 121, 122 on the support member 101 upwardly or downwardly movably.

A stage 110 carrying the pick-up head 9 comprises an upper rectangular frame 112, opposite legs 114, 115 extending downward from the opposite ends of the frame 112, and a central leg 113 extending downward from the central portion of the frame 112. The head 9 is fixedly mounted on the rectangular frame 112. Laterally resiliently bendable four plate springs 131 are secured, each at its one end, to upper or lower portions of the movable member 103 at opposite sides thereof, and the other ends of the springs 131 are secured to upper or lower ends of the central leg 131 of the stage 110 at either side of thereof. By means of the plate springs 131, the stage 110 is supported laterally movably (i.e. sidewise in FIG. 11). Consequently, the stage 110 is free to move upward or downward (for focusing) and laterally (tracking).

The support plate 100, support member 101, movable member 103 and stage 110 are made of a nonmagnetic material, e.g., plastics.

Yokes 104, 105 are fixed to the support member 101 and the movable member 103 on the inner side thereof. The yoke 104 comprises a vertical portion 104a fixed to the support member 101, another vertical portion 104b spaced apart therefrom and a horizontal portion interconnecting the two portions 104a, 104b at their lower ends. The yoke 105, which is exactly identical with the yoke 104 in shape, comprises two vertical portions 105a, 105b which are spaced apart by a distance.

A permanent magnet 106 is fixed to the inner surface of each of the vertical portions 104a, 105a of the yokes 104, 105, the S pole of the magnet being adjacent to the inner surface, for example. The legs 114, 115 of the stage 110 extend into the spaces between the other vertical portions 104b, 105b and the permanent magnets 106 without contacting the vertical portion or the magnet.

A focusing drive coil 123 is horizontally wound around the two legs 114, 115 of the stage 110. Each of the legs 114, 115 is partly provided with tracking drive coils 133 opposed to the permanent magnet 106 and having a vertically extending portion.

The focusing drive mechanism is best seen in FIG. 10. As indicated in broken lines, the magnetic fluxes H produced by the magnets 106 are directed toward the yoke vertical portions 104b, 105b. When a drive current, for example, toward the plane of FIG. 10 is passed through the horizontally wound coil 123 across the magnetic field, an upward force Ff occurs to move the stage 110 upward. The amount of movement of the stage 110 is adjustable according to the value of the current through the coil 123. Thus, focusing control is realized by changing the direction of the drive current, adjusting the current value or turning on or off the power supply in response to the output signal from the differential amplifier 71.

The tracking drive mechanism is best shown in FIG. 11. When a drive current, for example, toward the plane of FIG. 11 (downward in FIG. 9) is passed through the portions of the coils 133 extending vertically across the magnetic field H, an upward (lateral in FIG. 9) force Ft occurs in FIG. 11, moving the stage 110 in the same direction. Tracking control can be realized by turning on or off the power supply to the coils 133, or changing the direction of the current or, when required, adjusting the current value in response to the output signal from the differential amplifier 72.

Other Embodiments

Although the off-axis lens 13 is used in the above embodiment, another embodiment provided with a in-line lens is described hereinafter. By adopting lens means of in-line type for causing the incident light perpendicular to the substrate to emerge vertically (perpendicularly to the substrate) and for focusing the emergent light, the pattern designing and fabricating the in-line lens means are rendered easy in comparison with that of the off-axis lens.

Figure 12:
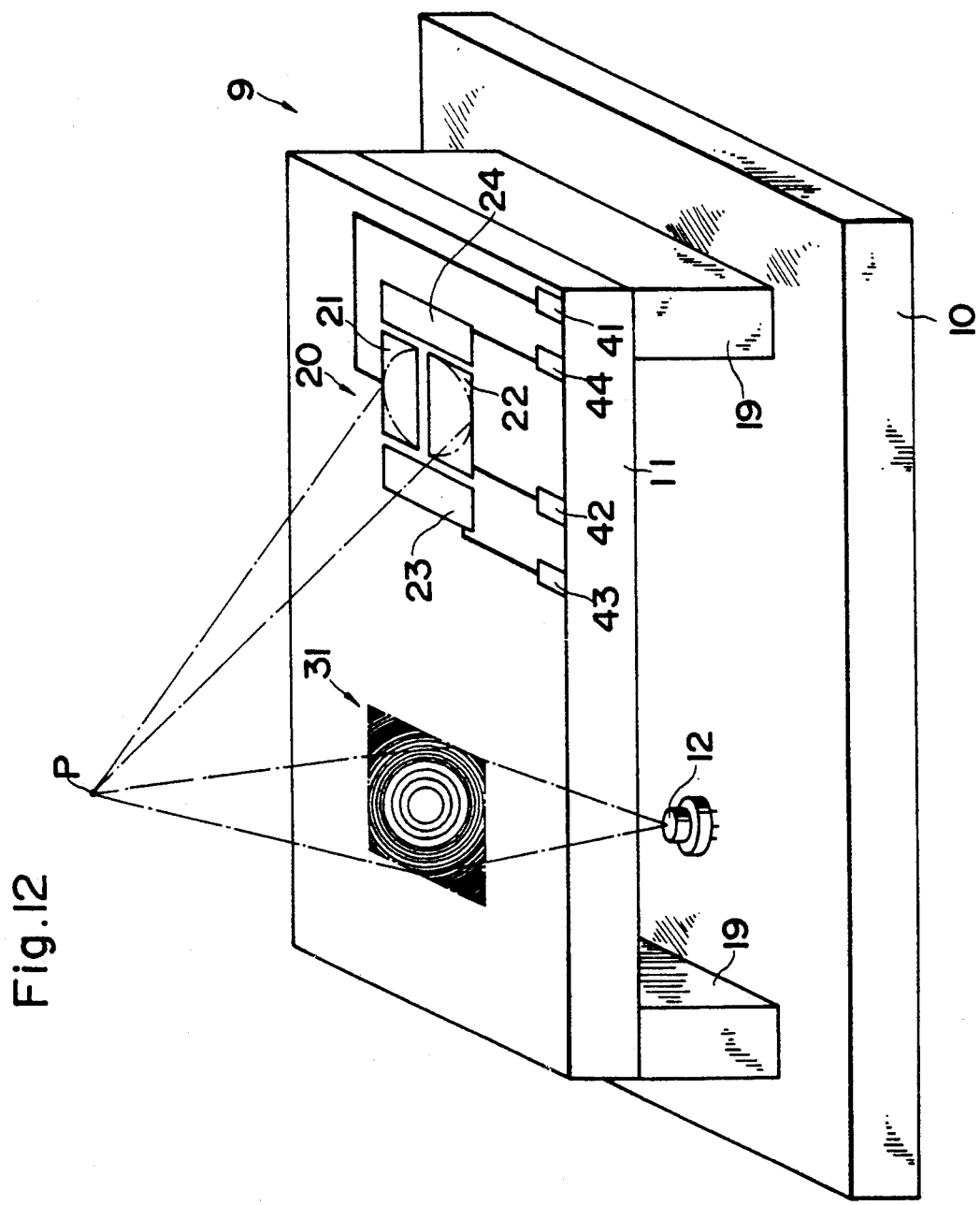
FIGS. 12 and 13 show another example, FIG. 12 being a perspective view of an optical pick-up head, and FIG. 13 being a sectional view of the same.
Figure 13:
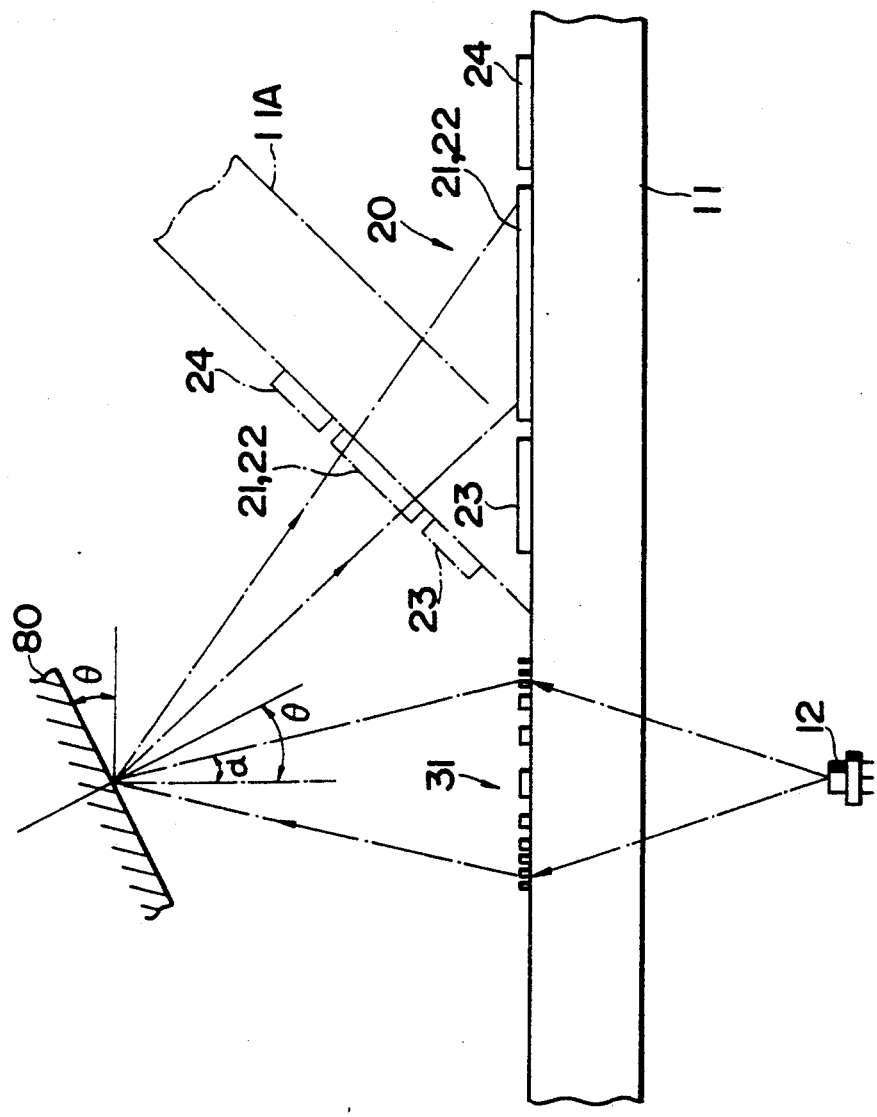

With reference to FIGS. 12 and 13, the substrate 11 is provided with a in-line Fresnel lens 31 at a portion thereof. The semiconductor laser 12 serving as a light source is disposed just below the Fresnel lens 31. The Fresnel lens 31 cause the diverging light emitted from the semiconductor laser 12 disposed below the Fresnel lens 31 and transmitted to the lens 31 through the substrate 11 to emerge substantially vertically upward and for focusing the emergent light two-dimensionally. The emergent light from the lens 31 impinges on the surface of the optical disc 80 obliquely. The impinging light is reflected from the optical disc surface obliquely and is received by the light receiving unit 20.

To separate the incident light to and reflected light from the optical disc 80 from each other, the following arrangement is required and enough. With reference to FIG. 13, it is assumed that converging angle of the incident light from the lens 31 to optical disc 80 is α, the angle formed by the optical axis of incident light with the normal line which is perpendicular to the surface of the optical disc 80 is θ. The incident light and the reflected light are separated from each other if the condition θ>α is satisfied.

Preferably, the substrate 11 is bent at the center thereof as indicated in broken line (dot-and-dask line) in FIG. 13 to cause the reflected light to impinge on the light receiving unit 20 substantially vertically, when the glass or the like is used as a material of the substrate 11. In the above structure, the surface portion provided with the lens 31 and the surface portion provided with the unit 20 form an obtuse angle with each other.

Figure 14:
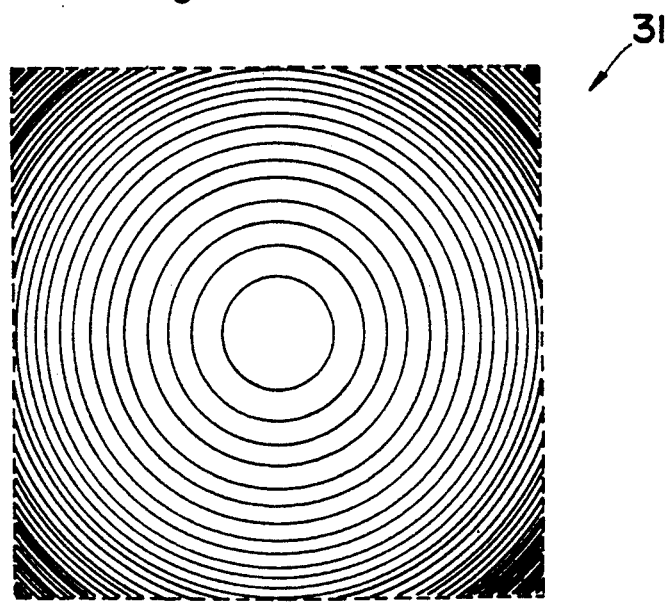
FIGS. 14 and 15 show a Fresnel lens used in the device shown in FIGS. 12 and 13, FIG. 14 being a plan view and FIG. 15 being a sectional view.
Figure 15:
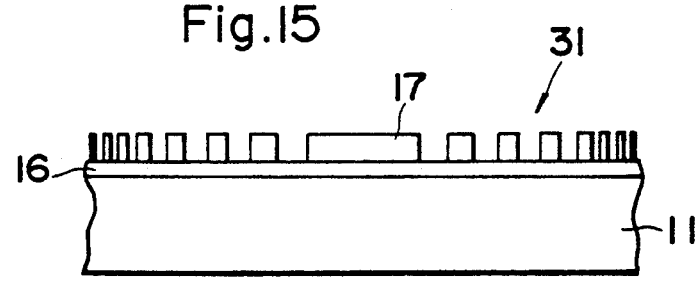

FIGS. 14 and 15 shows the construction of Fresnel lens 31 comprising a circular grating of phase type or diffraction type. This lens 31 is also fabricated by above mentioned electron beam lithography.

Figure 16:
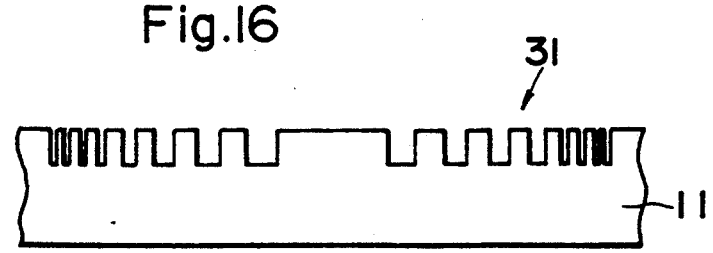
FIG. 16 is a sectional view showing another example of the Fresnel lens.

As shown in FIG. 16, the lens 31 is also made by etching the substrate (glass) 11 directly.

Figure 17:
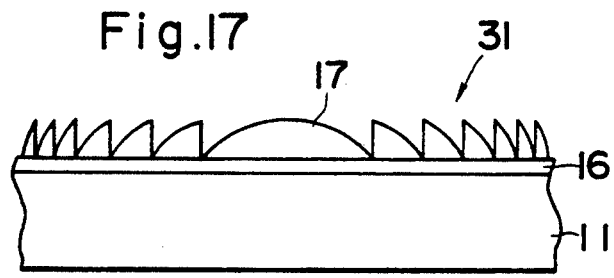
FIGS. 17 and 18 are sectional view showing further examples of the Fresnel lens.
Figure 18:
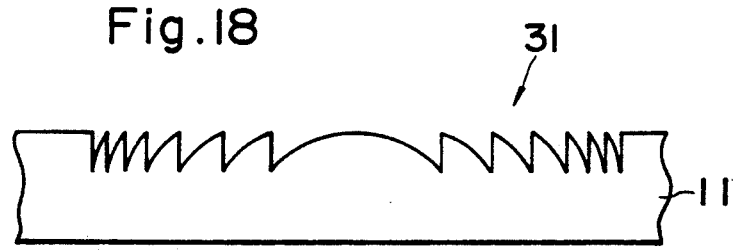

A blazed Fresnel lens is preferably adopted to enhance the lens efficiency as shown in FIGS. 17 and 18. FIG. 17 shows a blazed Fresnel lens of loaded type which is same as that shown in FIG. 15, and FIG. 18 shows a lens of etched type as in FIG. 16.

The detection of focusing errors and detection of tracking errors are performed according to the principle discribed above in this embodiment, too.

In the optical pick-up heads as described above, the emergent light impinges on to the disc surface obliquely and the light reflected from the disc surface obliquely is received. Since the light passes through the air and base of the optical disc obliquely, an aberration occurs in the emergent light and reflected light due to the refractive index difference between these media, resulting such problems that the spot on the disc is liable to be obscure and distorted especially owing to the aberration of emergent light.

In the pick-up head having a substrate provided with an optical system for projecting light onto the disc and an optical system for receiving reflected light from the disc, the above problem is overcome in the embodiment which will be described hereinbelow, by providing an aberration compensation plate between the substrate and the disc. Preferably, the compensation plate has the same refractive index as that of the base of disc, more desirably the plate is made of the same material as that of the disc base.

It is possible to reduce the aberration due to the refractive index difference by disposing the aberration compensation plate. Accordingly, a clear and very small spot is formed on the disc, enabling more accurate optical information processing.

Figure 19:
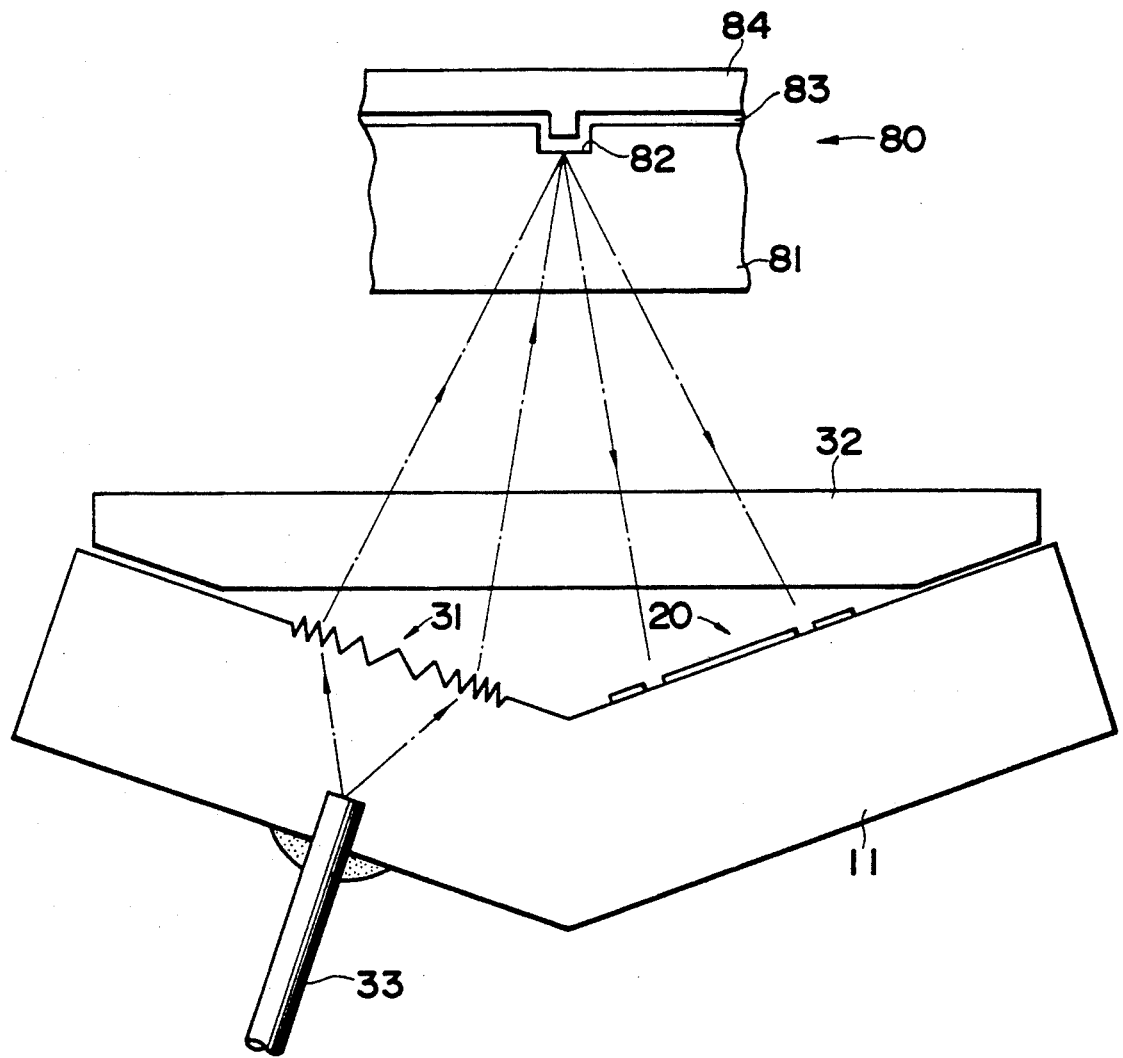
FIG. 19 is a sectional view showing a further developed example of optical pick-up head provided with a aberration compensation plate.

In FIG. 19, the substrate 11 is made of a transparent material for the light to be used such as glass or plastics and comprises a part having an upper surface provided with lens 31 thereon and another part having an upper surface provided with the light receiving unit 20 thereon, these upper surfaces forming an obtuse angle with each other. Accordingly, the light emerges from the lens 31 perpendicularly to the surface of the substrate 11 and the reflected light from the optical disc 80 impinges on to the light receiving unit 20 perpendicularly. It does not need to say that the substrate 11 is fixed onto a suitable base supported by the focusing and tracking drive mechanism as described above.

One end of a optical fiber 33 is disposed just below the microlens 31 such as micro-Fresnel lens formed on the substrate 11. The light transmitted from a light source such as semiconductor laser is led through the optical fiber 33 to the end thereof, from which the light emerges and propagates through the substrate 11 while diverging toward the lens 31. The end of optical fiber 83 is inserted into a hole formed on the lower surface of the substrate 11 and fixed to the substrate 11 by an adhesive.

The substrate 11 is provided with an aberration compensation plate 32 disposed above thereof, the plate 32 being fixed to the substrate 11 by suitable fixing means. The plate 32 is made of a material having the same refractive index as that of the base 81 of the optical disc 80, preferably of the same material as that of the base 81.

The plate 32 is substantially same as the base 81 in thickness.

The emergent light from the lens 31 propagates toward the optical disc 80 through the compensation plate 32 and impinges onto the pit 82 through the base 81. Similarly, the reflected light from the pit 82 impinges the light receiving unit 20 passing through the base 81 and compensation plate 32. The aberration of the emergent light and reflected light due to the refractive index difference between the air and the base 81 almost vanishes.

Figure 20:
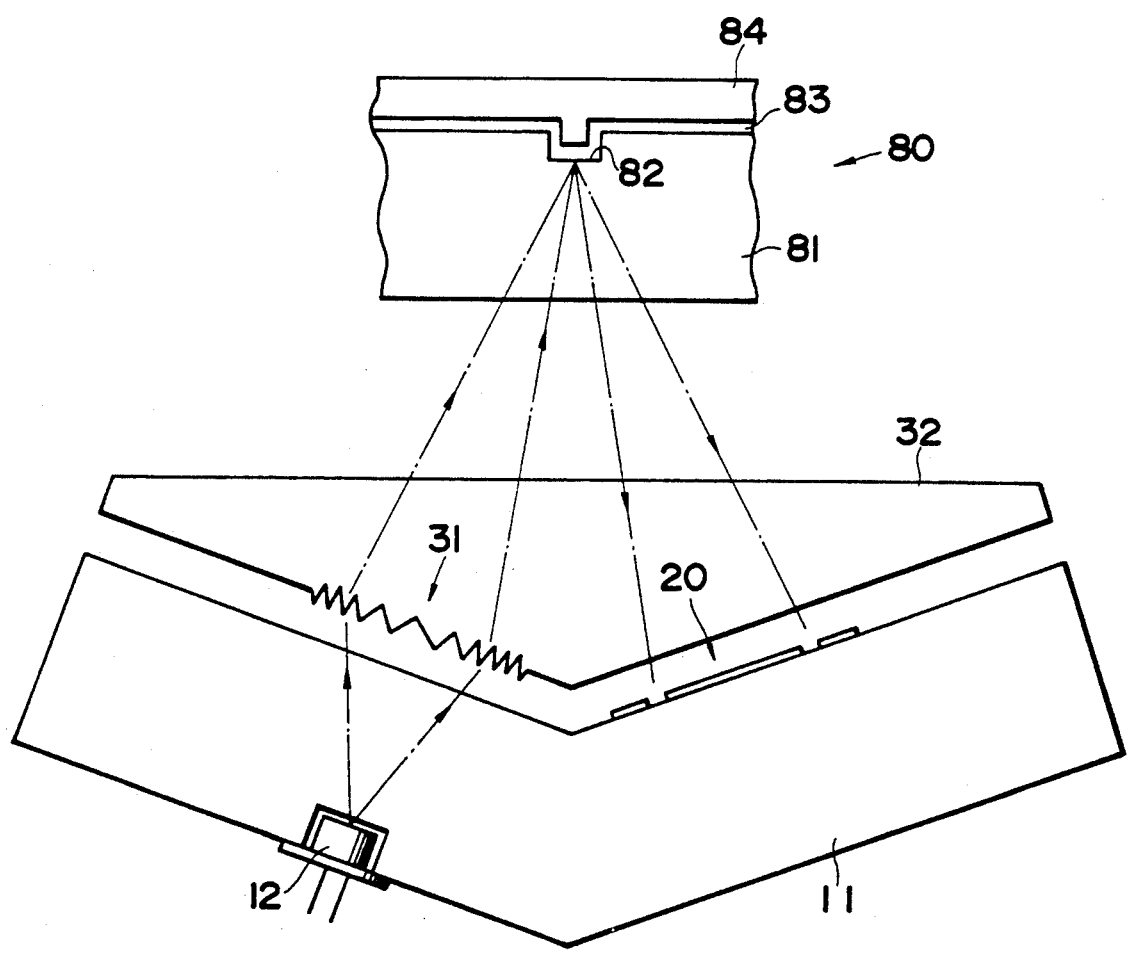
FIG. 20 is a sectional view showing a modification of above optical pick-up head.

FIG. 20 shows another example. The substrate 11 is provided with the semiconductor laser 12 serving as a light source in place of the optical fiber 33. The compensation plate is of triangular shape in section, the under surface thereof matching with the lower surface of the bent substrate 11. The compensation plate 32 is provided with the lens 31 on the lower surface thereof.

In this way, the shape of the compensation plate 32 is designed so as to resolve the problem of aberration.

Figure 21:
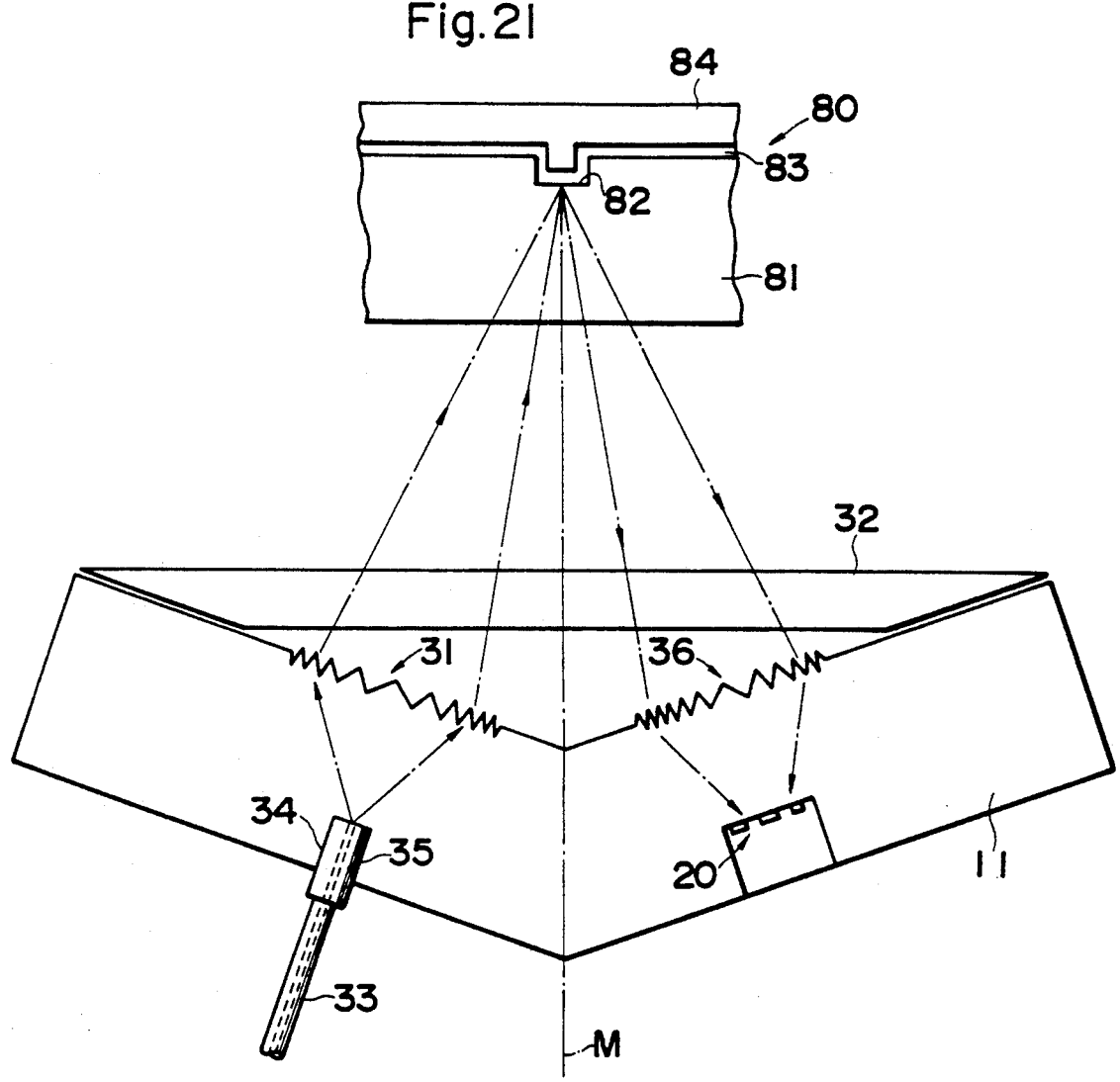
FIGS. 21 and 22 show still another embodiment of the present invention, FIG. 21 being a sectional view of the substrate of optical pick-up head, and FIG. 22 being an arrangement of whole optical pick-up head and peripheral equipment thereof.
Figure 22:
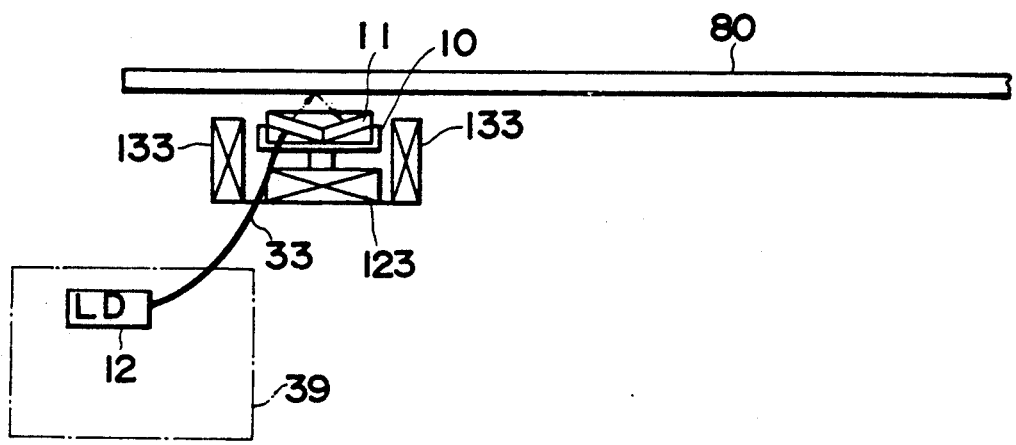

FIGS. 21 and 22 shows still another embodiment of the present invention.

The semiconductor laser 12 is provided within a signal processing apparatus disposed separately from the optical pick-up head. The optical fiber 33 is provided with a ferrule 34 at the end thereof and is inserted into a hole 35 formed previously on the under surface of the substrate 11 and further fixed thereto after position adjustment.

The semiconductor laser 12 which is a light source is provided separately from the substrate 11. This serves to render the substrate 11 more light-weight and the focusing and tracking mechanism more small-sized, and further to achieve rise of response speed of the mechanism. Further, since the light projected from the end of optical fiber 33 has circular section, even if the section of the light emitted from the semiconductor laser 12 is a elliptic shape, it is possible to use a normal focusing lens without special shape or construction, enabling it easy to make. The spot formed by focusing with the normal lens is circular shape in section. Furthermore the high-power spot light is obtained because a high-power semiconductor laser can be used. It is also easy to align the optical axis between the optical fiber 33 and the lens 31.

The substrate 11 is also provided with a lens 36 for receiving the reflected light, the lens 36 being formed on the substrate 11 at a position symetrically corresponding to the position of the lens 31 with respect to a line M which is perpendicular to the surface of the optical disc 80 and passes through the pit 82. This lens 36 receives the reflected light from the data record surface of the optical disc 80 and focuses the reflected light. The lens 36 also made by the same manner as described above concerning the fabrication of the lens 31. A recess is formed on the under surface of the substrate 11. The light receiving unit 20 is disposed on the bottom of the recess where the focal plane of the lens 36 is positioned.

By providing the light receiving lens 36 in this way, the reflected light from the optical disc 80 is focused by the lens 36 and focused light is detected by the light receiving unit 20. Accordingly, it is possible to form one photodetector or plural photodetectors included in the light receiving unit 20 in a small size, thereby rise of S/N ratio and response of the received signal is acheived.

Figure 23:
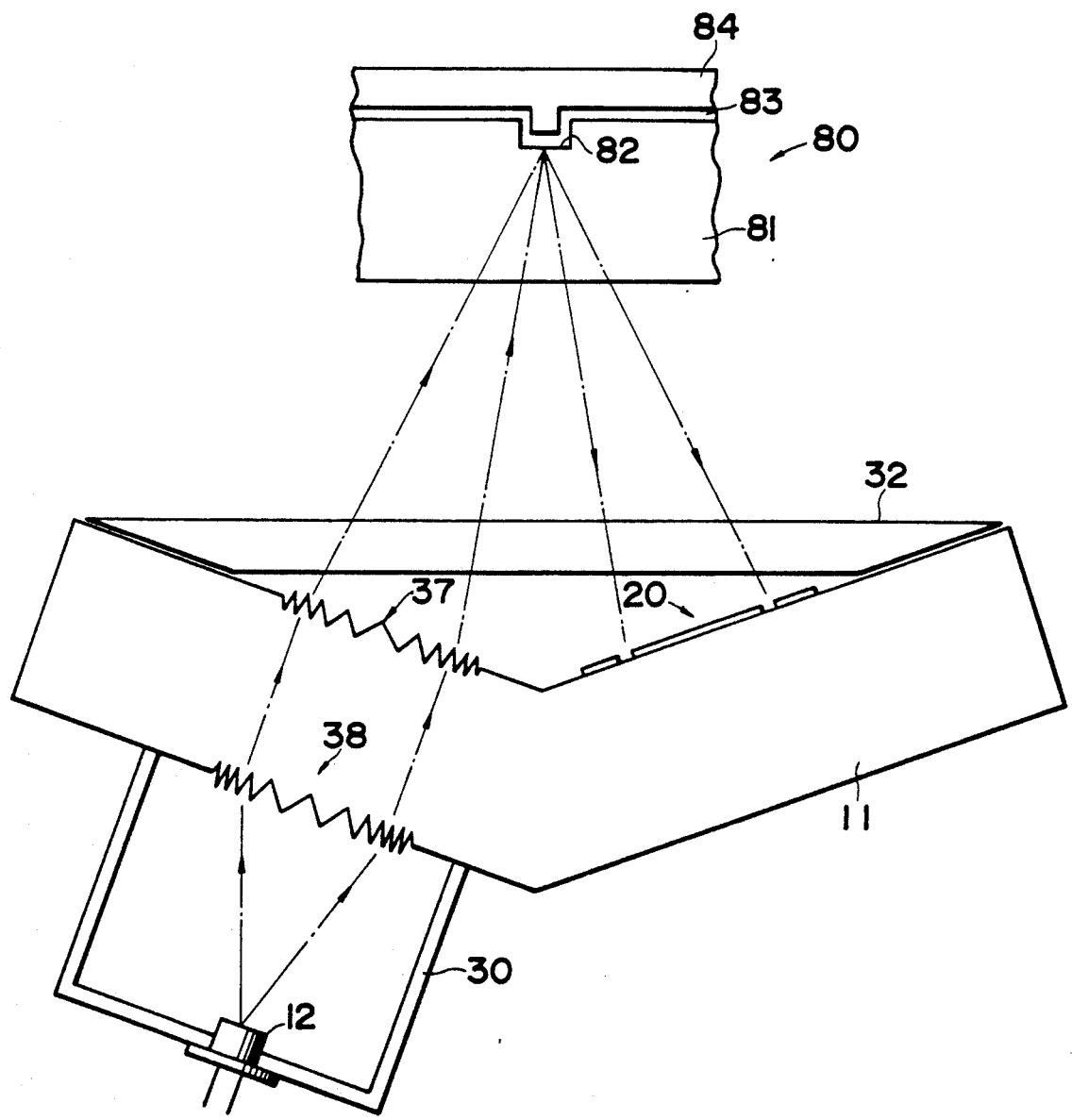
FIG. 23 is a sectional view of an optical pick-up head showing a still further example.

FIG. 23 shows further embodiment. A microlens 37 such as micro-Fresnel lens is formed on the upper surface of the substrate 11. The substrate 11 further provided with another microlens 38 formed on the under surface thereof at the position facing to the above lens 37. The light source such as semiconductor laser 12 is fixed to a holder 30 which is attached to the under surface of the substrate 11. The light emitted from the semiconductor laser 12 and spreading out propagates toward the lens 38. This spreading light is, converted into a beam of parallel rays by the lens 38. The beam of parallel rays traversing through the substrate 11 is caused to emerge into the air and focused into a small spot (about 1 μm in diameter) formed on the optical disc 80 by the lens 37.

As described above, according to this embodiment, since the diverging light from the light souce is converted into a beam of parallel rays by the lens 38 and then this beam of parallel rays is focused by the lens 37, the lens patterns are simplified in comparison with foregoing embodiments where the diverging light is converted into converging light by one lens. This assures easy fabrication, cost down and improved productivity.

Three-Beam System

Figure 24:
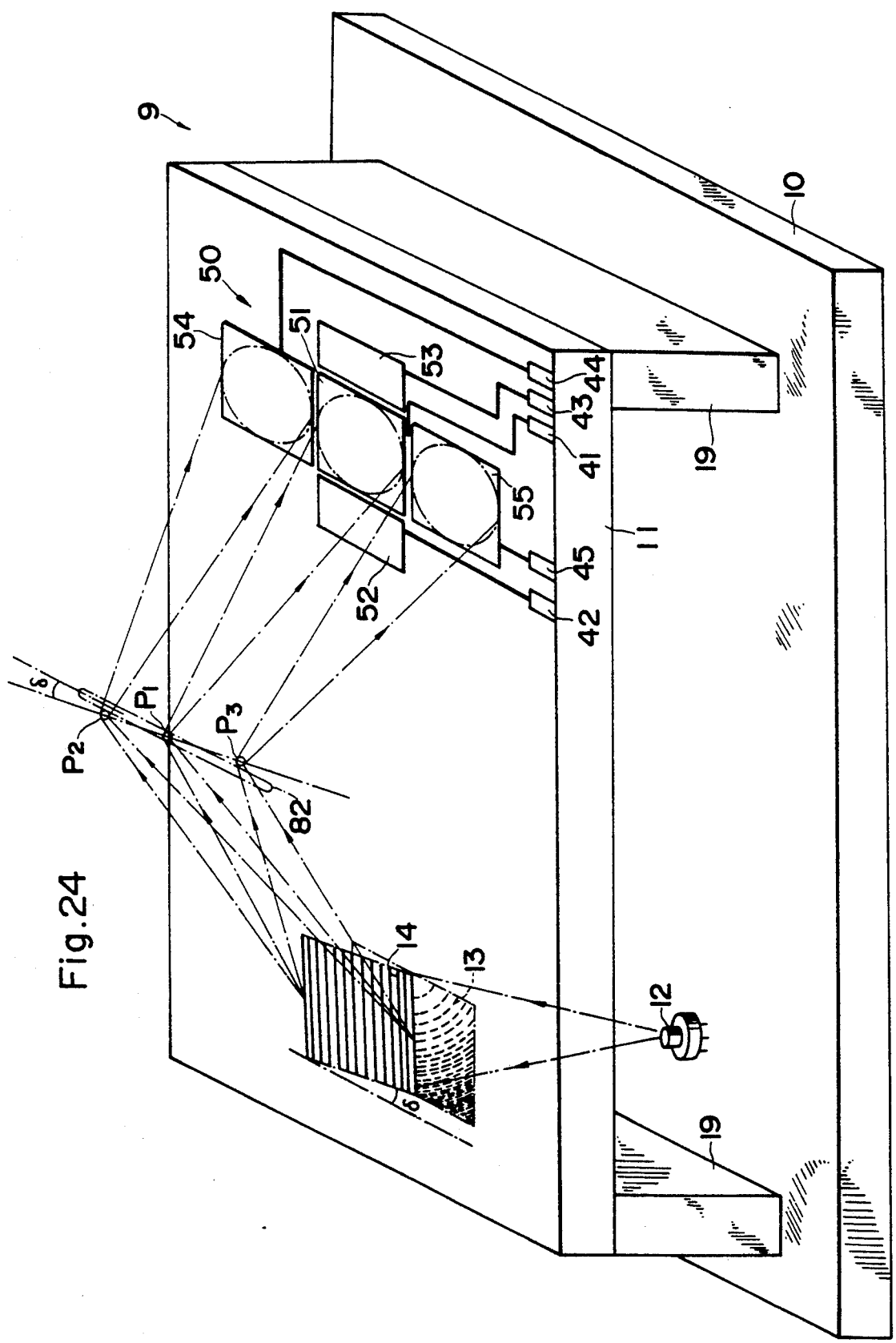
FIGS. 24 and 25 show a device of three-beam type, FIG. 24 being a perspective view of optical pick-up head and FIG. 25 being a diagram illustrating the principle for detecting traking errors.

FIG. 24 shows an optical pick-up head of three-beam type.

The substrate 11 is provided with the off-axis grating lens 13 formed on the under surface thereof. A grating 14 is formed on the upper surface of the substrate 11 at a position facing to the grating lens 13. A semiconductor laser 12 serving as a light source is disposed just below the grating lens 13. The grating lens 13 causes to emerge the diverging light emitted from the semiconductor laser 12 disposed below and propagating toward the lens 13 transmitting through the substrate 11 obliquely upward from the substrate surface and focuses the emergent light two-dimensionally. The grating 14 divides the light being focused by the lens 13 and being emerging obliquely upward into three beams. That is, the grating 14 causes the Raman-Nath diffraction of the light. The transmission light (light wave corresponding to order m=0) focuses at point P1, and diffracted light beams of order m=+1 and −1 focus at the points P2 and P3 both sides of the point P1, respectively. These laser spots P1 to P3 are about 1 μm in diameter and are spaced apart by a distance of about 20 μm. The central laser spot P1 is used for reading data from optical discs and for detecting focusing errors. The side laser spots P2, P3 are used for detecting tracking errors. These focused spots P1 to P3 are on the same plane (disc data record surface) and are substantially aligned.

The grating 14 is inclined at an angle of δ with one side of the substrate 11. Accordingly, a supposed line connecting spots P1, P2 and P3 is also inclined with respect to a line running parallel with the above one side of the substrate 11 (longitudinal direction of the disc pit 82). However, since the tracking errors can be also detected by slightly inclining the entire optical pick-up head 9 with respect to the direction of the pit 82 (tangental direction of the optical disc), it is not necessarily to provide the grating 14 on the substrate 11 in the inclined state.

The light receiving unit 50 shown is so disposed as to receive the beams reflected obliquely downward from the positions of the spots P1 to P3. The unit 50 comprises five independent photodetectors 51 to 55. The central photodetector 51 is used for reading data and receives the reflected beam from the point P1. The photodetectors 52, 53 in front and rear of the photodetector 51 are used for detecting focusing errors. The photodetectors 54, 55, which are used for detecting tracking errors as positioned on opposite sides of the photodetector 51, receive the beams reflected from the points P2, P3.

The focusing errors are detected according to the principle described with reference to FIG. 6 in this embodiment, too.

Figure 25:
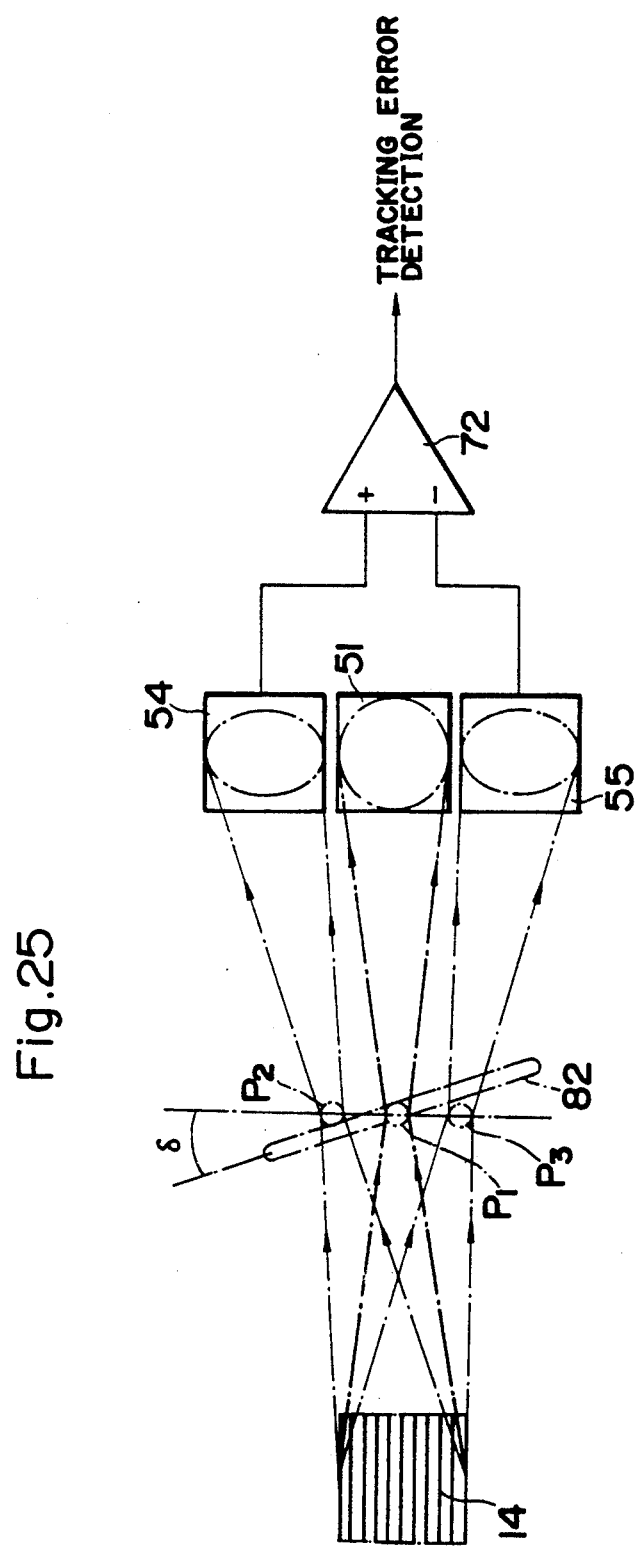

FIG. 25 shows the principle for detecting tracking errors in the three-beam system.

While proper tracking control is achieved, the central laser spot P1 is at the center of width of the pit 82. The other two spots P2, P3 are away from the center. Although the spots P2, P3 may be partly positioned at the pit 82, the displacements of the spots P2 P3 from the pit 82 are equal to each other. The photodetectors 54, 55 receiving the beams reflected from the spots P2, P3 are connected to a differential amplifier 72. If the spot P1 deviates from the pit 82, one of the other spots P2, P3 moves away from the pit 82, while the other spot moves toward the widthwise center of the pit 82. Consequently, the amounts of light received by the photodetectors 54, 55 differ, causing the amplifier 72 to produce a positive or negative voltage according to the direction of the deviation, and the output voltage value represents the degree or extent of the deviation.

Photomagnetically Writing and Reading Head

Figure 26:
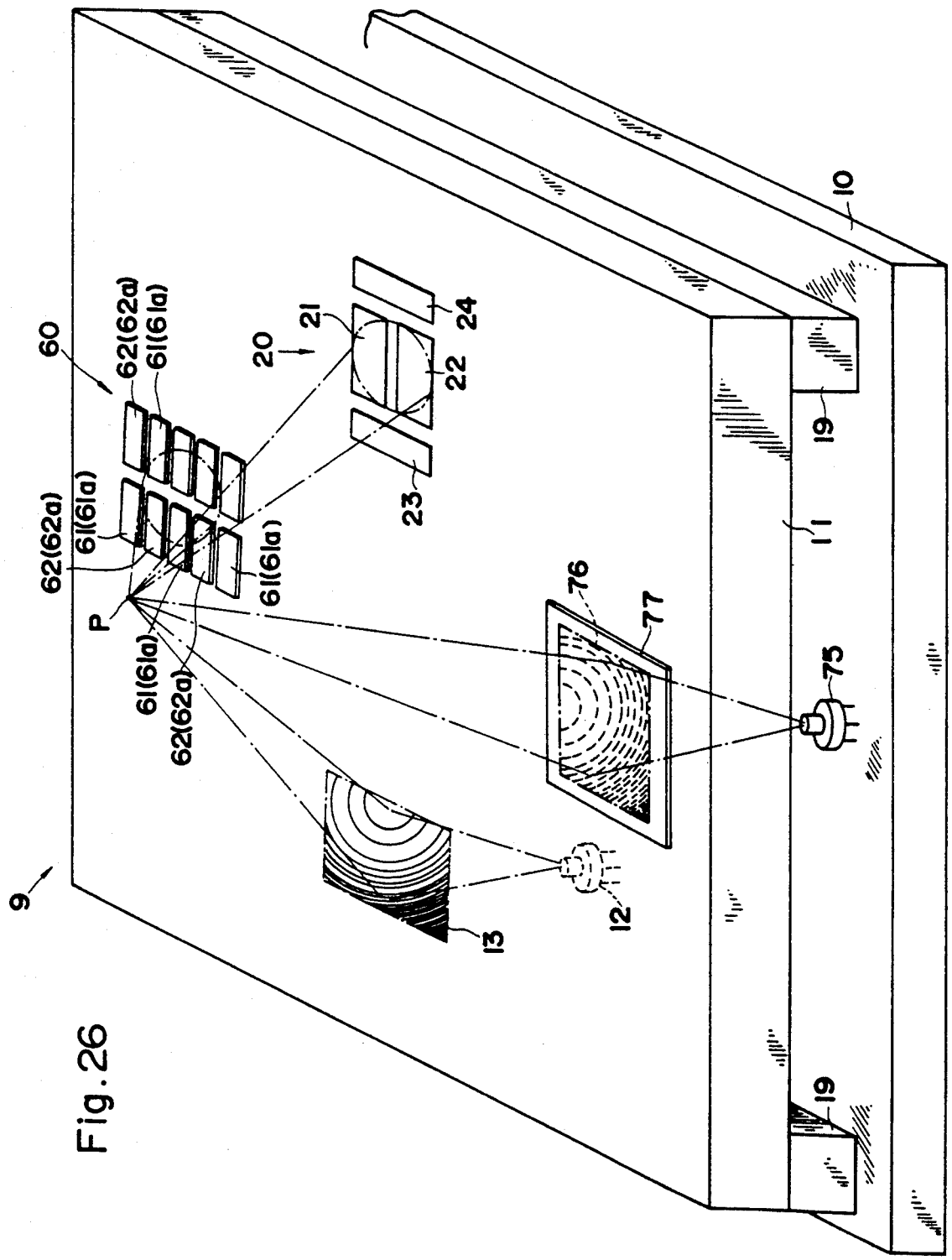
FIG. 26 is a perspective view showing a photomagnetically writing and reading head.

FIG. 26 shows an example of the construction of the head 9 for writing data in photomagnetic discs and for reading data therefrom. Only the optical system is shown but a coil for producing magnetic field required for writing data photomagnetically is not depicted.

An optical system (second optical system) for detecting focusing errors and tracking errors is the same as that shown in FIG. 1.

An optical system (first optical system) for writing data in the photomagnetic discs and for reading data therefrom also comprises, similarly to the second optical system, a semiconductor laser 75, grating lens 76 and light receiving unit 60. The light emitted from the semiconductor laser 75 impinges onto the under surface of the substrate 11 while diverging, transmits through the substrate 11 in the direction of the thickness thereof, emerges into the air from the grating lens 76 and focuses at point P as mentioned above. The reflected light from the magnetic record surface of the photomagnetic disc is received by the unit 60.

A polarizer piece 77 is affixed onto the grating lens 76. This polarizer piece 77 is used for converting the light caused to emerge from the grating lens 76 into a linearly polarized light.

Figure 27:
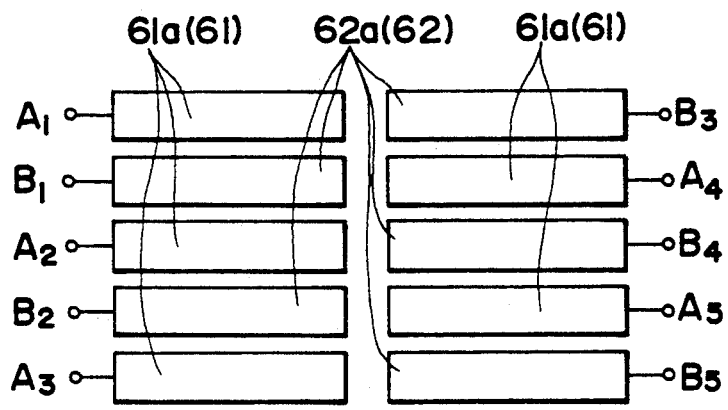
FIG. 27 is a plan view showing an arrangement of light receiving portion for reading.

The light receiving unit 60 comprises many photodetectors 61a and 62a (see also FIG. 27). These photodetectors 61a and 62a are made in the same manner as the photodetectors 21 to 24. Analyzer pieces 61 and 62 are affixed onto the photodetectors 61a and 62a, respectively. These analyzer pieces 61 and 62 are so disposed that the principal axes thereof make a right angle with each other. That is, the planes of polarization of linearly polarized light beams detected by these analyzers 61 and 62 have a right angle with each other. Further the analyzers 61 and 62 making a right angle with each other are arranged alternatively.

One-beam system is depicted in FIG. 26 as an optical system for error detection, two-beam system or three-beam system as described above may be usable.

Data is written in the photomagnetic disc by the head of the present embodiment according to magnetic modulation method or optical modulation method. In this case, a coil is disposed near the laser spot P. A direct optical play-back method is usable for reading date from the photomagnetic disc.

Figure 29:
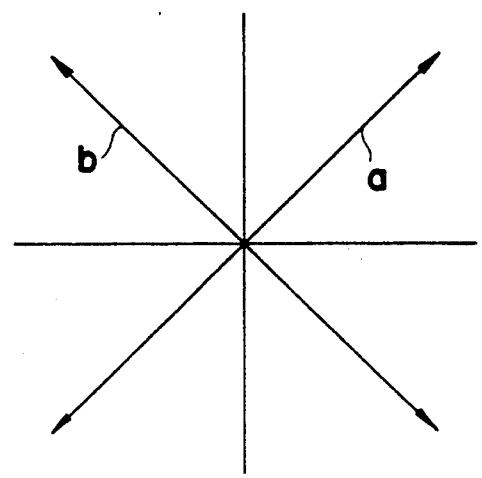
FIG. 29 is a diagram showing directions or orientations of principal axes in analyzers.

Arrows a and b shown in FIG. 29 indicate the directions or orientations of principal axes of the analyzers 61 and 62, respectively. As seen from FIG. 29, the principal axes of analyzers 61 and 62 make a right angle with each other.

Figure 28:
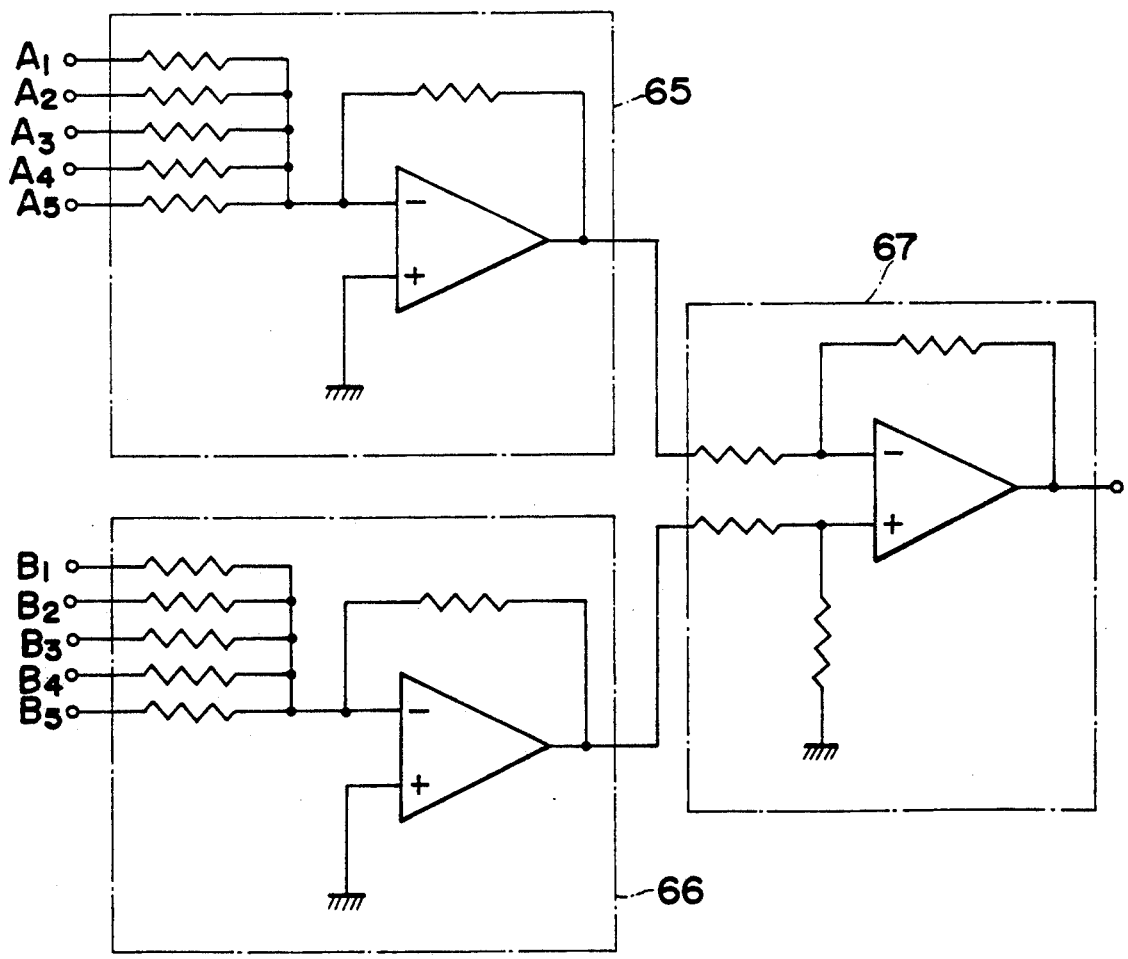
FIG. 28 shows a reading circuit.

FIG. 28 shows an example of reading circuit. Output signals (output terminals A1 to A5) of the photodetectors 61a disposed beneath the one kind of analyzers 61 are fed into an adding circuit 65 to be added to each other. Similarly, output signals (output terminals B1 to B5) of the photodetectors 62a disposed beneath the other kind of analyzers 62 are fed into an adding circuit 66 to be added to each other. Outputs of these circuits 65 and 66 are fed into a differential amplifier 67, which produces an output signal representing the difference value therebetween.

Figure 30A:
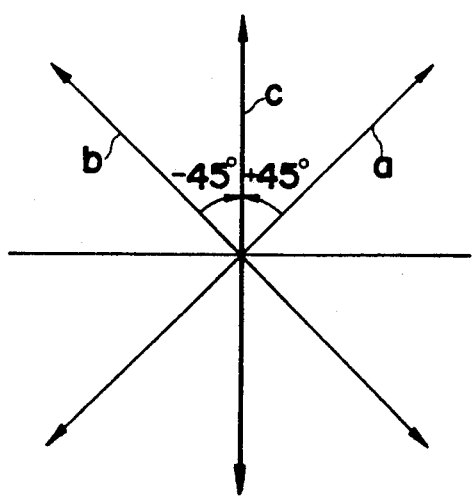
FIG. 30a is a diagram showing a reference direction of polarization of reflected light and FIG. 30b is a diagram showing a polarization direction rotated by magnetooptic effect.
Figure 30B:
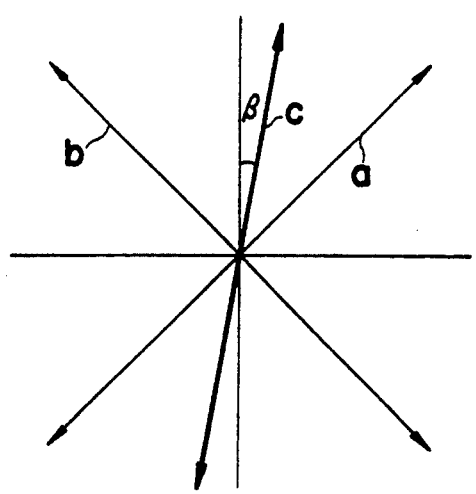

The light emerging from the grating lens 76 is converted into the linearly polarized light, which is reflected from the surface of the photomagnetic disc, and the reflected light is detected by the photodetectors 61a and 62a through the analyzers 61 and 62. An arrow c given in broad solid line in FIG. 30a indicates the direction (plane) of polarization of the light reflected from the photomagnetic disc at a portion where no data is recorded. The direction of polarization (arrow c) of this reflected light is inclined at an angle of $+45°$ with the principal axis of analyzer 61 (arrow a) and at an angle of $-45°$ with the principal axis of analyzer 62 (arrow b). In this case, the values of the output signals from the adding circuit 65 and 66 are same with each other, these values being assumed to be Io. When the light impinges onto the photomagnetic disc at a portion where data is recorded magnetically, the polarization plane of reflected light therefrom rotates by a cirtain angle according to magnetooptical effect (Kerr effect). The direction of polarization in this reflected light is indicated by the arrow c in FIG. 30b. The values of outputs from the adding circuits 65 and 66 are $(Io+A\beta)$ and $(Io-A\beta)$, respectively, where A is a constant. Accordingly, the differential amplifier 67 supplies an output of value of $2A\beta$, which is the reading signal. The amounts of the reading signals are proportional to amounts of recorded data on the photomagnetic disc.

Other Embodiments

Figure 31:
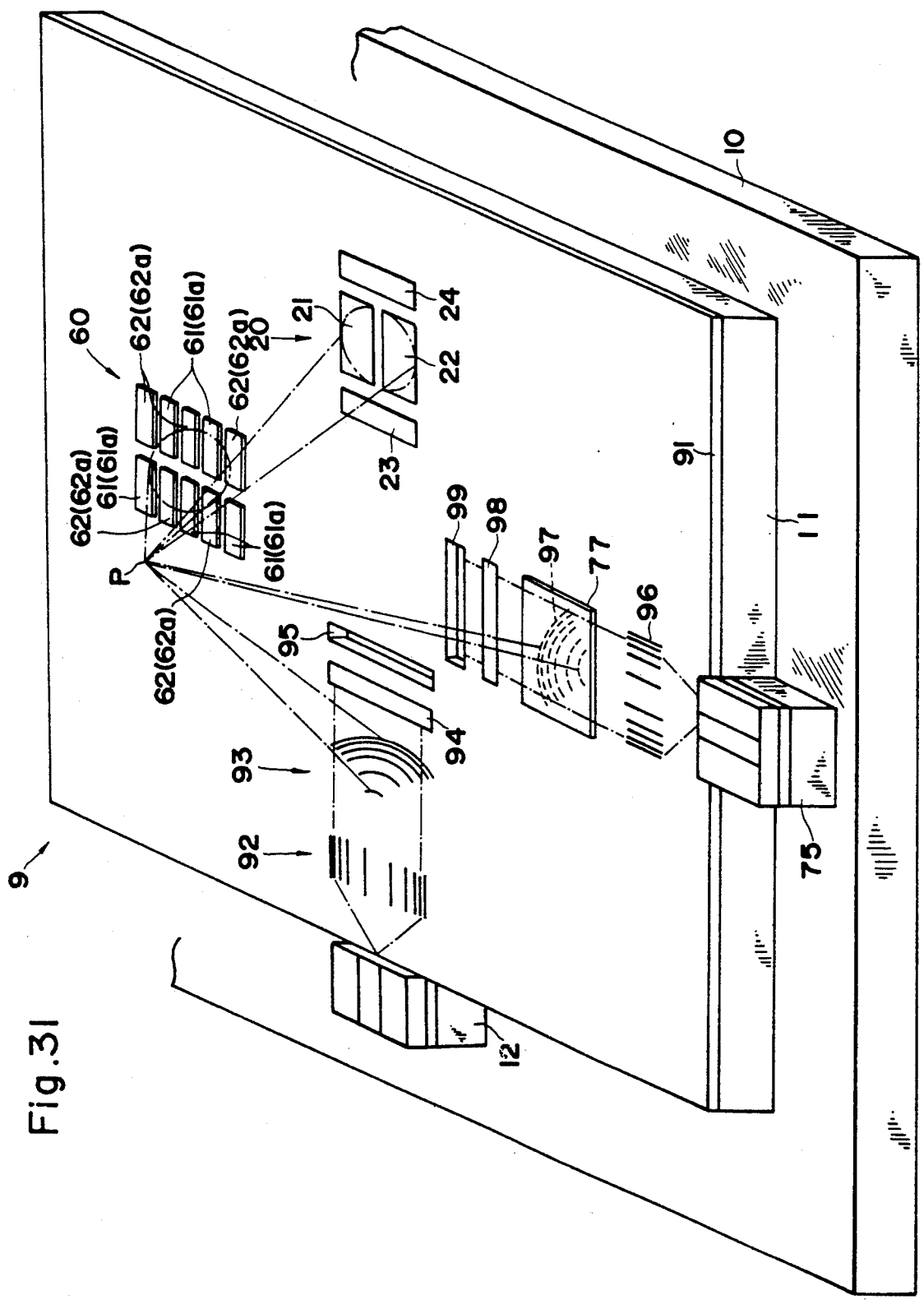
FIG. 31 is a perspective view showing another example of head for writing and reading photomagnetically.

FIG. 31 shows another example of the head for writing data in photomagnetic disc and for reading data therefrom. At first, the second optical system is explained.

The substrate 11 is made, for example, of a silicon crystal. An optical waveguide layer 91 formed over the upper surface of the substrate 11 by thermally oxidizing the upper surface of the substrate 11, vacuum evaporation of $SiO_2$ or sputtering of $SiO_2$ to form an $SiO_2$ buffer layer on the upper surface, and thereafter sputtering glass over the layer. The semiconductor laser 12 is coupled to the waveguide layer 91 on the substrate 11 at one end thereof by the butt edge coupling method. The laser 12 emits a laser beam, which is admitted into, and propagates through, the waveguide layer 91. A collimating lens 92, coupling lens 93, leak light sensor 94, leak light blocking groove 95 and the light receiving unit 20 are arranged on the optical waveguide layer 91 in the order mentioned. The collimating lens 92 converts the laser beam, spreading out when emitted from the laser 12, into a beam of parallel rays. Examples of collimating lenses for use on the waveguide layer include a Bragg grating lens, Luneburg lens, geodesic lens, etc. and the Fresnel lens as shown in FIG. 31. The laser beam propagating through the layer 91 is caused to emerge obliquely upward and two-dimensionally focused by the coupling lens 93. This type of coupling lens is called a two-dimensional focusing grating coupler having the function of emitting light and the function of focusing the light two-dimensionally. The lens comprises circular arc projections and recesses arranged at a decreasing spacing toward the direction of travel and providing a grating.

The whole light propagating through the waveguide layer 91 is not always emitted (air coupled) by the coupling lens 93, but there is a portion of light passing through the position of the lens 93 and leaking toward the light receiving unit 20 without being emitted. The leak light sensor 94 detects the intensity of the leak light. The variation in the intensity of light propagating through the layer 91 appears also as variation in the intensity of leak light, so that the intensity of light propagating through the layer 91 can be detected indirectly by detecting the intensity of leak light. The intensity signal obtained upon detection is fed back to the drive circuit (not shown) for the laser 12 to stabilize the light output of the laser 12. The sensor 94 is made of amorphous silicon (a-Si), CdTe, CdS or the like and is formed directly on the waveguide layer 91 by the CDV process, vacuum evaporation, sputtering or the like. The detection signal from the sensor 94 is taken out through a wiring pattern (not shown) formed on the substrate 11.

The whole leak light from the layer 91 is not always consumed by the sensor 94. Since the light receiving unit 20 and the sensor 94 are formed on the same substrate 11, leak light passing through the portion of the sensor 94, if present, could be detected by the unit 20. The leak light blocking groove 95 is provided between the sensor 94 and the light receiving unit 20 to prevent light from propagating from the position of the sensor 94 toward the unit 20 by reflection and attenuation of light by the groove defining wall. The groove 95 is formed directly in the layer 91 on the substrate 11 by ion beam working, electron beam working or laser working. The groove 95 has a length larger than the width of the propagating beam and has a depth nearly equal to the thickness of the waveguide layer 91.

The optical system (the first optical system) for writing data in -the photomagnetic disc and for reading data therefrom comprises, similarly to the above mentioned second optical system, the semiconductor laser 75, a collimating lens 96, coupling lens 97, leak light sensor 98, leak light blocking groove 99 and the light receiving unit 60. The light emitted from the semiconductor laser 75 and collimated by the collimating lens 96 is caused to emerge into the air and focused at the point P as described above. The coupling lens 97 is provided with the polarizer piece 77 affixed thereon.

The coupling lens may comprise a combination of a Fresnel grating lens having the funciton of converging a beam of parallel rays within the optical waveguide layer 91 and chirped grating coupler having functions to emit the light propagating through the layer 91 and to one-dimensionally converge the light to a straight line. The grating coupler comprises straight projections and recesses (grating) arranged at a decreasing spacing toward the direction of travel of light. When the focal point of the grating lens and the focal line of the grating coupler are at the same point P, the light emerging from the layer 91 focuses at the point P.

In the foregoing embodiments, although the projecting optical system for emitting the light into the air and the light receiving optical system are provided on one substrate, the optical systems may be formed on respective substrates separately. An optical waveguide layer may not be formed on a substrate on which the light receiving optical system is provided.

Further, n-GaAs crystal may be used for the substrate, over which the waveguide layer, which is made of p-GaAs, is formed with an AlGaAs provided therebetween. The semiconductor laser may be integral with the substrate.

Furthermore, although the system given in FIG. 31 is an one-beam system serving as error detecting optical system, two-beam system or three-beam system may be usable. In these cases, the light collimated by the collimating lens 92 is divided into two or three light beams, and these light beams are caused to emerge into the air separately by two or three coupling lenses and are focused at different positions.

What is claimed is:

1. A device for processing optical data comprising:
   a transparent substrate means onto which light is to be applied,
   a light source for projecting light onto one surface of the substrate means substantially perpendicularly to said one surface,
   lens means provided on the substrate means for causing the light projected from the light source and passing through the transparent substrate means in the direction of thickness thereof to emerge upward from the other surface of the substrate means obliquely with respect to a surface of a memory disc oriented substantially parallel to said one surface of said substrate means onto which light is projected by said light source and for focusing the emergent light,
   means provided on the substrate means adapted to receive light reflected from above the memory disc,
   a focusing drive means for simultaneously adjusting the positions of the substrate means and light source upward or downward, and
   a tracking drive means for simultaneously adjusting the positions of the substrate means and light source laterally.

2. A device as defined in claim 1 wherein said lens means causes the projected light to emerge obliquely upward from the other surface of the substrate means.

3. A device as defined in claim 1 wherein said lens means causes the projected light to emerge perpendicularly to the other surface of the substrate means and upwardly from the surface.

4. A device as defined in claim 1 wherein said substrate means comprises a single substrate.

5. A device as defined in claim 1 wherein said substrate means comprises a first substrate provided with the lens means and a second substrate provided with the light receiving means.

6. A device as defined in claim 1 wherein said light source is a semiconductor laser fixed to the one surface of the substrate means at the position where the semiconductor laser faces to said lens means.

7. A device as defined in claim 1 wherein said light receiving means comprises a semiconductor chip formed with plural photoconductive elements that are affixed to the substrate means.

8. A device as defined in claim 1 wherein said lens means is formed integrally with the substrate means.

9. A device as defined in claim 1 wherein said lens means causes the projected light to emerge upward as separated into three light beams and focuses the separated light beams two-dimensionally at three different positions.

10. A device as defined in claim 1 wherein said light receiving means detects light reflected obliquely from above.

11. A device as defined in claim 1 wherein said light receiving means detects light reflected perpendicularly to the surface of the substrate means from above.

12. A device as defined in claim 1 wherein said substrate means is provided with two optical systems each comprising a light source, lens means and light receiving means.

13. A device as defined in claim 1 further comprising an optical fiber having one end fixed to the substrate means adjacent the lens means and another end disposed adjacent said light source, said optical fiber being oriented such that the light emitted from the light source disposed separately from the substrate means is led to the lens means through the optical fiber and the substrate means, the light emerging from said one end of the optical fiber and traversing the thickness of the substrate means to reach the lens means.

14. A device as defined in claim 1 further comprising lens means provided on said substrate means for focusing reflected light wherein said light receiving means detects the focused light.

15. A device as defined in claim 1 wherein said lens means comprises first lens means for converting the diverging light emitted from said light source into a beam of parallel rays and second lens means for causing the collimated light to emerge from the substrate means and for focusing the emergent light.

16. A device as defined in claim 1, further comprising a disc memory, said substrate comprising a first optical system for projecting a light beam onto said disc memory and a second optical system for receiving light reflected from said disc memory, said device further comprising an aberration compensation means disposed between said disc memory and said substrate.

17. A device as defined in claim 1, wherein said lens means comprises means for causing light projected thereby to impinge obliquely on a disc having optical data recorded thereon, and wherein light reflected obliquely from said disc is received by said light receiving means.

18. A device for processing optical data having a substrate provided with a first optical system for projecting a light onto a disc memory and a second optical system for receiving the light reflected from the disc memory, the device comprising an aberration compensation plate means disposed between the disc memory and the substrate.

19. An optical data processing device for writing data in a photomagnetic disc memory and/or reading data therefrom comprising:

a first optical system for projecting a light spot focused on the photomagnetic disc memory and for receiving the light reflected therefrom, for writing and/or reading data, a second optical system for detecting errors to cause the projected light spot to follow the track of the photomagnetic disc memory, a substrate provided with the first and second optical systems, the substrate being transparent for the light applied to the optical systems, wherein the first optical system comprises;

a light source for projecting the light onto one surface of the substrate substantially perpendicularly to the surface, lens means provided on the substrate for causing the projected light to emerge obliquely upward from the other surface of the substrate and focusing the emergent light two-dimensionally, light receiving means provided with at least two photoconductive elements for detecting the light reflected obliquely from above, and analyzers disposed on the photoconductive elements so that the principal axes thereof make a right angle with each other, and wherein the second optical system comprises;

a light source for projecting the light onto one surface of the substrate substantially perpendicularly to the surface, lens means provided on the substrate for causing the projected light to emerge obliquely upward from the other surface of the substrate and focusing the emergent light two-dimensionally, and means for receiving the light reflected obliquely from above.

20. An optical data processing device for writing data in a photomagnetic disc memory and/or reading data therefrom comprising:

a first optical system for projecting a light spot focused on the photomagnetic disc memory and for receiving the light reflected therefrom, for writing and/or reading data, a second optical system for detecting tracking and/or focusing errors to cause the projected light spot to follow the track of the photo magnetic disc memory, an optical waveguide formed on a substrate, a light source for the laser beam to be admitted into the waveguide, lens means provided on the waveguide for causing the beam propagating through the waveguide to emerge obliquely upward and focusing the emergent beam two-dimensionally, wherein said first optical system comprises:

light receiving means provided with at least two photoconductive elements for detecting the light reflected obliquely from above, and analyzers disposed on the photoconductive elements so that the principal axes thereof make a right angle with each other, and said second optical system comprises:

an optical waveguide formed on a substrate, a light source for the laser beam to be admitted into the waveguide;

lens means provided on the waveguide for causing the beam propagating through the waveguide to emerge obliquely upward and focusing the emergent beam two-dimensionally, means for receiving the beam reflected obliquely from above.

21. A device for processing optical data comprising:

a transparent substrate means onto which light is to be applied, a light source for projecting light onto one surface of the substrate means substantially perpendicular to said one surface, lens means provided on the substrate means for causing the light projected from the light source and passing through the transparent substrate in the direction of thickness thereof to emerge perpendicular to and upward from the other surface of the substrate means and for focusing the emergent light, the emergent light obliquely impinging on a surface of a memory disc, and means provided on the substrate means adapted to receive light reflected obliquely from above from the memory disc.

22. A device as defined in claim 21 wherein said lens means and said light receiving means are provided on the same substrate means which comprises a single substrate.

23. A device as defined in claim 21 wherein said substrate means comprises a first substrate provided with the lens means and a second substrate provided with the light receiving means.

24. A device as defined in claim 21 wherein said light source is a semiconductor laser fixed to the other surface of the substrate means at the position where the semiconductor laser faces said lens means.

25. A device as defined in claim 21 wherein said light receiving means comprises a semiconductor chip formed with plural photoconductive elements that are affixed to the substrate means.

26. A device as defined in claim 21 wherein said lens means is formed integral with the substrate means.

27. A device as defined in claim 21 wherein said lens means causes the projected light to emerge upward and be separated into three light beams and focuses the separated light beams in two-dimensions at three different positions.

28. A device as defined in claim 21 further comprising:

a focusing drive mechanism for adjusting the position of the substrate means upward or downward, and a tracking drive mechanism for laterally adjusting the position of the substrate means.

29. A device as defined in claim 21 wherein said substrate means is provided with two optical systems each comprising a light source, lens means and light receiving means.

30. A device as defined in claim 21 further comprising an optical fiber, one of which is fixed to the substrate means, wherein the light emitted from the light source disposed separate from the substrate means is led to the lens means through the optical fiber and the substrate means, the light emerging from said one end of the optical fiber and traversing the thickness of the substrate means to reach the lens means.

31. A device as defined in claim 21 further comprising lens means provided on said substrate means for focusing reflected light, wherein said light receiving means detects the focused light.

32. A device as defined in claim 31, wherein said reflected light focusing lens means is disposed on the other surface of said substrate means and said light receiving means is disposed on the one surface of said substrate means.

33. A device as defined in claim 21 wherein said lens means comprises first lens means for converting the diverging light emitted from said light source into a beam of a parallel rays and second lens means for causing the collimated light to emerge from the substrate means and for focusing the emergent light.

34. A device as defined in claim 21, further comprising an aberration compensation means disposed between said memory disc and said substrate means.

35. A device for processing optical data comprising:

a transparent substrate means onto which light is to be applied, a light source for projecting light onto one surface of the substrate means substantially perpendicularly to said one surface, light projecting lens means provided on the substrate means for causing the light projected from the light source and passing through the transparent substrate in the direction of thickness thereof to emerge perpendicularly to and upwardly from the other surface of the substrate means and for focusing the emergent light, the emergent light obliquely impinging on a surface of a memory disc, and means provided on the substrate means adapted to receiving light reflected from the memory disc obliquely and impinging thereon perpendicularly to the other surface of the substrate means.

36. A device as defined in claim 35, wherein said other surface of said substrate means comprises a first slant surface on which said light projecting lens means is provided and a second slant surface on which said light receiving means is provided.

37. A device as defined in claim 35 further comprising light receiving lens means provided on said substrate means for focusing reflected light, wherein said other surface of said substrate means comprises a first slant surface on which said light projection lens means is provided and a second slant surface on which said light receiving lens means is provided, and wherein said light receiving means detects the light focused by said light receiving lens means.

38. A device as defined in claim 35, wherein said substrate means is bent.

39. A device as defined in claim 35 wherein said lens means and said light receiving means are provided on the same substrate means which comprises a single substrate.

40. A device as defined in claim 35 wherein said substrate means comprises a first substrate provided with the lens means and a second substrate provided with the light receiving means.

41. A device as defined in claim 35 wherein said light source is a semiconductor laser fixed to the other surface of the substrate means at the position where the semiconductor laser faces said lens means.

42. A device as defined in claim 35 wherein said light receiving means comprises a semiconductor chip formed with plural photoconductive elements that are affixed to the substrate means.

43. A device as defined in claim 35 wherein said lens means is formed integrally with the substrate means.

44. A device as defined in claim 35 wherein said lens means causes the projected light to emerge upward and be separated into three light beams and focuses the separated light beams in two-dimensions at three different positions.

45. A device as defined in claim 35 further comprising:

a focusing drive mechanism for adjusting the position of the substrate means upward or downward, and a tracking drive mechanism for laterally adjusting the position of the substrate means.

46. A device as defined in claim 35 further comprising an optical fiber, one end of which is fixed to the substrate means, wherein the light emitted from the light source disposed separate from the substrate means is led to the lens means through the optical fiber and t he substrate means, the light emerging from said one end of the optical fiber and traversing the thickness of the substrate means to reach the lens means.

47. A device as defined in claim 35 further comprising lens means provided on said substrate means for focusing reflected light, wherein said light receiving means detects the focused light.

48. A device as defined in claim 35, wherein said reflected light focusing lens means is disposed on the other surface of said substrate means and said light receiving means is disposed on the one surface of said substrate means.

49. A device as defined in claim 35 wherein said lens means comprises first lens means for converting the diverging light emitted from said light source into a beam of a parallel rays and second lens means for causing the collimated light to emerge from the substrate means and for focusing the emergent light.

50. A device as defined in claim 35, further comprising an aberration compensation means disposed between said memory disc and said substrate means.

* * * * *

UNITED STATES PATENT AND TRADEMARK OFFICE
CERTIFICATE OF CORRECTION

PATENT NO. : 5,159,586
DATED : October 27, 1992
INVENTOR(S) : TSUKASA YAMASHITA, ET AL.

It is certified that error appears in the above-identified patent and that said Letters Patent is hereby corrected as shown below:

ON THE TITLE PAGE:

[30] Foreign Application Priority Data

Insert the following:

--Jan. 28, 1986 [JP] ......... 61-14840--.

Signed and Sealed this

Ninth Day of November, 1993

Attest:

BRUCE LEHMAN

Attesting Officer      Commissioner of Patents and Trademarks